(12) United States Patent
Barreras, Sr. et al.

(10) Patent No.: US 6,863,805 B1
(45) Date of Patent: Mar. 8, 2005

(54) AUTOMATED, SELF-CONTAINED, HOME SEWAGE TREATMENT SYSTEM

(76) Inventors: Francisco J. Barreras, Sr., 8925 Collins Ave., Unit 9A, Surfside, FL (US) 33154; Daniel E. Barreras, 8925 Collins Ave., Unit 9A, Surfside, FL (US) 33154

(*) Notice: Subject to any disclaimer, the term of this patent is extended or adjusted under 35 U.S.C. 154(b) by 126 days.

(21) Appl. No.: 10/306,325

(22) Filed: Nov. 27, 2002

(51) Int. Cl.[7] .......................... B01D 21/30; B01D 21/02
(52) U.S. Cl. ................. 210/143; 210/187; 210/532.2
(58) Field of Search ................... 210/175, 187, 210/748, 220, 532.2, 749, 753–756, 97, 103–105, 143

(56) References Cited

U.S. PATENT DOCUMENTS

| | | | | |
|---|---|---|---|---|
| 2,921,681 A | * | 1/1960 | Toulmin, Jr. ............... | 210/747 |
| 3,623,977 A | * | 11/1971 | Reid ......................... | 210/612 |
| 3,948,601 A | | 4/1976 | Fraser et al. ............... | 21/54 |
| 4,050,907 A | * | 9/1977 | Brimhall ..................... | 48/111 |
| 5,162,083 A | | 11/1992 | Forbes et al. .............. | 210/199 |
| 5,441,632 A | * | 8/1995 | Charon ...................... | 210/170 |
| 5,647,986 A | | 7/1997 | Nawathe et al. .......... | 210/608 |
| 5,697,291 A | | 12/1997 | Burgener et al. ........... | 99/451 |
| 6,063,271 A | * | 5/2000 | Howard ..................... | 210/177 |
| 6,156,192 A | * | 12/2000 | Rummler | |
| 6,200,472 B1 | * | 3/2001 | Donald et al. ........... | 210/195.1 |
| 6,248,985 B1 | | 6/2001 | Tomasello ................. | 219/679 |
| 6,558,550 B1 | * | 5/2003 | Kelly | |
| 2003/0029783 A1 | * | 2/2003 | Donald et al. ........... | 210/195.4 |
| 2003/0066804 A1 | * | 4/2003 | Tipton et al. .............. | 210/739 |

* cited by examiner

*Primary Examiner*—Chester T. Barry
(74) *Attorney, Agent, or Firm*—Thomas R. Vigil; Welsh & Katz, Ltd.

(57) ABSTRACT

A small and cost effective sewage treatment system intended for unattended use in individual homes, small industries or businesses in locations where a central sewage treatment plant is not available. The sewage treatment system comprises a conventional septic tank which drains into a smaller aerated holding tank, a pump to transfer effluent from the holding tank into a disinfecting chamber, a regenerative heat exchanger used to raise the temperature of the effluent while being aerated in the holding tank, means for pumping the effluent at a controlled rate through a microwave field, and a conventional drain field used to release the disinfected water into the surrounding soil. Operation of this system is fully regulated by a micro-controller, thereby eliminating the need for human intervention during normal use. This invention also incorporates electronic means for detecting various fault conditions which may impede effective disinfection, means for diagnosing what part of the system is at fault, means for reporting the fault and diagnose to a central municipal location via a telephone or transponder system, an emergency battery backup system, and means for reverting system operation to that of a conventional septic tank and drain field system is case of a total power failure (both A/C and DIC) or water pump failure. Conventional household alternating current or a battery recharged via a wind generator or solar cells may power the sewage treatment system.

60 Claims, 12 Drawing Sheets

AUTOMATED, SELF-CONTAINED, HOME SEWAGE TREATMENT SYSTEM

BACKGROUND OF THE INVENTION

1. Field of the Invention

The present invention relates to a small, automated sewage treatment system to be installed and used in individual residences in lieu of a large-scale municipal sewage treatment plant.

2. Description of the Prior Art

Self-contained subterraneous sewage treatment systems have been mostly used in communities where residences are not connected to a municipal, centralized sewage treatment facility. Most types of subterraneous sewage treatment system comprise a large septic tank whose effluent is discharged directly into a large drain field where pathogens are supposed to breakdown with soil contact. The entire sewage flow is powered by gravity and the tank itself is water tight and usually divided by a baffle into two interconnected compartments. This division allows for improved digestion of waste materials. When the waste enters the septic tank, the heavy solids (primarily feces) sink to the bottom to form a layer of "sludge." The lighter materials (grease, fats, small food particles, etc.) float to the surface forming a layer of "scum." Between these two layers is a soup of suspended materials and water soluble chemicals, such as urea from urine and many household chemicals. The baffle between the two chambers has flow ports in the middle, thus allowing only the clarified water in the first compartment to enter the second one. This increases the efficiency of the septic tank at removing suspended solids. The second compartment receives its "load" of liquid mixture, already substantially clarified because most of the solid particles have settled out of the liquid in the first compartment. There also is little turbulence in the second compartment, because the load enters more slowly. Both of these factors allow settling of finer suspended solids in the first compartment.

The typical sources of waste entering a septic tank are toilets (approximately 38%), laundry (25%), showers/baths (22%) and sinks (15%). The principal contaminant of concern is microbiological, such as pathogenic bacteria and viruses from human feces. Phosphorus, a contaminant introduced from many laundry detergents, typically is not a groundwater contamination problem because it is readily taken up by iron, aluminum and calcium naturally occurring in the soil. Urea is converted by the septic tank flora into nitrate and ammonium. Possible metal contaminants include lead (from lead water pipes or lead solder on water pipes), arsenic (found as a contaminant in phosphate detergents), iron, tin, zinc, copper and cadmium. These metals are not typically a concern in septic systems.

The process of digestion in the septic tank is carried out primarily by microbes excreted from our gastrointestinal tracts, such as *E. coli*, for example. Digestion is an anaerobic process, meaning that oxygen is not required. Gases (hydrogen sulfide and methane) are produced and must be vented. Basically the same thing that happens in a septic tank also occurs in our intestinal tract and in centralized sewage treatment plants. However a properly operating septic tank probably is the most efficient of the three. In the septic tank the gases help stir the sludge, scum and liquid layers which promote further digestion of the solids. A properly functioning tank will convert the bulk of solids into liquid waste through the process of digestion and hence, decomposition.

The liquid faction that leaves the septic tank and enters the drain field is called the effluent. The bacterial level of the effluent is quite high, contrary to popular belief. Typically, the effluent from a septic tank still contains about 70% of the polluted matter in sewage. This effluent is irrigated into the drain field where it slowly percolates through the soil, and in theory pathogen levels are reduced as pathogens break down with soil contact. Bacteria are supposed to eventually die or be removed by the filtering effect of the soil before the effluent reaches the deeper source of drinking water such as an aquifer or spring. In reality, today we know that we can't always rely on "mother nature" to do the disinfecting for us due to the many variables involved in drain field design, operation and maintenance. In places like the Florida Keys, where the substrate consists mostly of porous coral rock with little top soil to slow down and decompose the septic effluent, these systems have significantly contributed to pollution of the surrounding ocean waters. The level of seawater pollution in the Florida Keys has become so critical that Monroe County has installed large air injection pumps at the bottom of the canals in residential areas in order to replenish the oxygen used up by the contaminants introduced into the sea water by conventional septic systems. Oxygen deprived sea water can't support marine life, either plant or animal.

Even in places where soil characteristics are thought be adequate for filtering and bacterial decomposition, there is a significant problem with groundwater contamination as a result of inadequate use and/or maintenance. This contamination is mostly microbiological. Microbes, both bacteria and viruses may remain alive much longer underground than when exposed to the elements above ground. They are small enough that they may travel with the plume of percolating water from the drain field and contaminate drinking water sources, either groundwater or wells.

Lately, new sewage disinfecting systems have been developed to treat the outflow of a septic tank, utilizing ultraviolet light, reverse osmosis membranes, forced oxygenation and/or ozone. All these systems offer effective sewage disinfecting if used within their operating parameters. The problem is that all the state-of-the-art systems available today for disinfection require periodic and professional maintenance, need human intervention for proper daily operation and do not offer an automated fault detection using redundant controllers, one to "operate" and the other to "supervise" and report to central municipal location a malfunctioning "operator."

In disinfection systems utilizing ultraviolet light disinfection, the light bulbs need to be replaced often and they are very expensive. Also, the bulbs need to be cleaned periodically to remove accumulated sediment or they will lose their effectiveness.

The disadvantages of reverse osmosis membranes, is that these membranes are expensive and they need to be back-flushed periodically or they lose their effectiveness.

Forced oxygenation systems can't guarantee that all the bacteria are killed all the time because of all the variables involved, such as varying ambient temperatures and a continuously fluctuating sewage volume and flow rate.

Ozone gas is a very effective disinfectant and deodorizer but it requires a large amount of electrical power to convert oxygen into ozone.

All of these systems do not offer the long-term reliability and effectiveness associated with professionally maintained municipal sewage treatment plants.

In summary, the long-term effectiveness of existing prior art home sewage treatment systems is compromised by their need for periodic and professional maintenance and they don't offer the level of reliability required for totally unattended operation.

For example, U.S. Pat. No. 3,948,601 to Fraser et al., teaches the use of RF waves to ionize argon into a gas plasma at approximately 100 to 500 C. It also teaches that effective sterilization can be accomplished with "cool plasma" at only 25 to 50 C and very low pressure. However, sterilization by plasma gas does not constitute direct RF sterilization. It also requires a much higher field strength and power consumption than is required for microwave sterilization. Also, because it lacks any type of fault detection and reporting to a central location, it is not suitable for unattended operation.

U.S. Pat. No. 5,162,083 to Forbes, et al., describes an individual home waste water treatment plant conversion apparatus. A method and apparatus for converting a standard anaerobic septic tank system to an aerobic system are disclosed. Disinfection is accomplished by adding chlorine into the effluent, thus making this system unsuitable for unattended applications.

U.S. Pat. No. 5,647,986 to Nawathe, et al., describes an automated wastewater treatment mini-plant intended for installation and use in individual residences. It comprises a settling tank to remove suspended solid, an intermediate tank, where the sewage is aerated and churned, an aerator-clarifier tank, where the effluent undergoes further aerobic treatment without dilution with incoming water, and a disinfecting tank, where a chemical disinfectant such as chlorine is added before dispersion of the treated water into a drain field. The use of a chemical disinfectant requires periodic addition of chlorine to the feed tank, making this system unsuitable for unattended applications, such as in a second home when the owner is away for long periods of time. This patent also describes the use of a microprocessor for automatically operating the system and for detecting and reporting faults to a central location. However, it lacks a mechanism or device for detecting a malfunctioning or an inoperable microprocessor which may render the wastewater treatment unit to function below specifications or inoperable, resulting in unpleasant and potentially serious health hazards for the community.

U.S. Pat. No. 5,697,291 to Burgener, et al., describes a method and apparatus for microwave pasteurization of a continuously flowing food product, such as juice or milk. It teaches careful preheating of the fluid to a temperature a few degrees below that of pasteurization or inactivation temperature coupled with precise temperature regulation during microwave pasteurization to avoid changing the food taste by scorching it. The Burgener method and apparatus are not meant to be used for sewage treatment applications, as they lack all the other elements necessary for proper sewage treatment.

U.S. Pat. No. 6,248,985 to Tomasello, teaches the use of relatively low frequency (11 MHz) RF waves and very high field strength (50 Kilovolts per meter) to heat and disinfect large amounts of medical waste as it is pushed through a large diameter tube (12 inches) by a screw-type extruder. The low frequency RF radiation heats the medical waste to between 90 and 100° C. The teachings of Tomasello are appropriate for large scale disinfection of medical waste where deep penetration by RF radiation is essential. Lower frequency, time-varying electric fields, penetrate deeply and heat objects more evenly. Higher frequency, time-varying microwaves (between 1 and 5 GHz) do not penetrate as deeply but heat more rapidly the cells of microorganisms they radiate, and therefore are more suitable for small scale sewage treatment if the design of the radiation chamber employs a large ratio of pipe length to pipe diameter, as taught by the present invention. Also micro-wave generators, magnetrons, which emit energy in the 1–5 GHZ range are readily available "off the shelf" and are very inexpensive, particularly with respect to radio frequency generators.

BRIEF SUMMARY OF THE INVENTION

The automated, unattended and economical home sewage treatment system of the present invention overcomes the disadvantages of the prior systems described above by providing a system that doesn't require the addition of chemicals or a periodic maintenance schedule and provides the means for the local health authorities to monitor its operating status.

In one preferred embodiment, the present invention comprises (a) a conventional septic tank, (b) a holding tank with two compartments, the first one to aerate the effluent at above ambient temperature and the second one to clarify the effluent, (c) a disinfection chamber requiring no chemicals or ultraviolet light bulbs, (d) a heat regeneration unit to conserve power, and (e) a drain field to discharge the disinfected water.

According to one aspect of the present invention, the effluent of a conventional septic tank is collected in a holding tank where (1) the temperature of the effluent is increased above ambient temperature, and (2) air is continuously injected to accelerate the rate of oxidation and decomposition of the microorganisms. This holding tank may have a capacity between 50 and 600 gallons, depending on the size of the household. It has two compartments divided by a weir or dam. The size of the first compartment is typically two thirds that of the second one. The effluent is oxygenated and heated in this first compartment to promote further bacterial digestion than is possible with only a conventional septic tank. As new effluent fills the aeration compartment, it spills over the top of the weir and into the second compartment, called the clarifying compartment, and it is used to allow the effluent to clarify the water as the heavier particles settle to the bottom.

According to another aspect of the present invention, the heavier particles that settle in the bottom of the clarifying compartment are periodically flushed out by a series of air jets directed toward the bottom. Subsequently, this water and suspended particles are pumped back into the septic tank for recycling and further digestion of the particles. When the clarified water reaches a predetermined high level, this batch of water is pumped through the microwave chamber for disinfection.

According to yet another aspect of the present invention, redundant dual sensors for detecting a high water level are employed in the second compartment of the holding tank to prevent overflowing of the effluent in case one of the sensors fails to switch-on the water pump. The micro-controller expects both high-water level detectors to activate almost simultaneously. If they don't one of the detectors has failed and needs to be replaced. In this event, the micro-controller will signal the central municipal location of the problem. This redundancy insures that high water will always be detected, thus precluding an overflow condition.

According to still another similar aspect of the present invention, redundant dual sensors for detecting a low water level are employed in the second compartment of the holding tank to stop the water pump once all the effluent in the second compartment has been emptied and disinfected. The micro-controller expects both low-water level detectors to activate almost simultaneously. If they don't one of the detectors has failed and needs to be replaced. In this event, the micro-controller will signal the central municipal location of the problem. This redundancy insures that low water will always be detected, thus preventing the water pump from running dry.

According to yet another aspect of the present invention, the microwave chamber exposes the effluent from the septic tank to microwave radiation with a frequency between one and 5 GHz as the effluent is pumped at a controlled rate through a long and winding pipe which is called a "radiation loop" in the apparatus of the present invention. This radiation loop moves back and forth, up and down the whole interior volume of the microwave chamber in order to expose the entire volume of effluent to a consistent high level of radiation as the effluent encounters the inevitable hot and cold spots caused by microwaves reflecting off the chamber walls. This radiation loop, is made from microwave-absorbing pipe material, such as polypropylene or polyethylene. The internal diameter of the pipe is two (2) inches or less because the effective penetration of microwaves through water is only about two inches. Microwaves are known to inactivate microbes entirely by heat through mechanisms comparable to other biophysical processes induced by heat, such as denaturation of enzymes, proteins, nucleic acids or other vital components. However, a second mechanism for inactivation by microwaves involves non-thermal effects. In a recent study by the U.S. Food and Drug Administration titled "Kinetics of Microbial Inactivation for Alternative Food Processing Technologies, Microwaves and Radio Frequency Processing" a second mechanism for inactivation by microwaves involves non-thermal effects. The study cites four predominant theories for explaining non-thermal inactivation by microwaves (cold pasteurization): "Selective heating, electroporation, cell membrane rupture, and magnetic field coupling (Kozempel and others 1998). The selective heating theory states that solid microorganisms are heated more effectively by microwaves than the surrounding medium and thus are killed more readily. Electroporation is caused when pores form in a membrane of a microorganism due to the electrical potential across the membrane, resulting in leakage. Cell membrane rupture is related in that the voltage drop across the membrane causes it to rupture. In the fourth theory, cell lysis occurs due to coupling of electromagnetic energy with critical molecules within the cells, disrupting internal components of the cell."

Another study conducted by the Pennsylvania State University Department of Biology titled "DNA and the Microwave Effect" demonstrates that "microwaves are capable of breaking the covalent bonds of DNA, a result that does not occur from heating alone."

Therefore, in one preferred embodiment of this invention, the effluent does not need to reach the conventional inactivation temperature of microorganisms (about 100° C.). Instead the present invention relies on non-thermal "microwave effects" to disinfect the effluent. Nevertheless, it will be obvious to anyone trained in the art, that the present invention is capable of raising the water temperature to 100° C. just by reducing the flow rate through the radiation loop or by temporarily halting the flow to allow the water to reach 100° C. Also it will be obvious to anyone trained in the art, that other means for heating the waste water to 100° C. may be employed without deviating from the teachings of the present invention, such as through the use of immersion heaters and gas fired heaters.

According to still another aspect of the present invention, the already disinfected hot water exiting the microwave chamber is used to raise the temperature of the effluent in the aerating compartment of the holding tank. This is accomplished through a heat exchanger where the heat from the disinfected water is transferred to the effluent being processed in the aerating compartment. Raising the temperature of the aerated effluent significantly accelerates the oxidation and decomposition rate of microorganisms. This is especially helpful in colder climates. This heating process does not consume any additional energy (it is basically free) and it helps to cool off the disinfected water before it is discharged into the drain field.

Another and alternative use of heat regeneration as described above is to use the already disinfected hot water exiting the microwave chamber to raise the temperature of the clarified water entering the disinfection chamber.

According to a further aspect of the present invention, a complete fault detection and diagnosis system is provided. This system is capable of monitoring each and every component of the sewage system. If any component of the system fails to operate or operates below specifications, a micro-controller will automatically report to a central location the exact cause of the fault so that the municipality can dispatch a technician to the home site with a replacement part. A conventional telephone system or alternatively a transponder communicating through the utility's power lines may be used. The micro-controller will up-link to the central location a series of bytes identifying (1) the name and telephone number of the home owner, (2) the home address, (3) the model and serial number of the sewage treatment system, (4) the component that has failed and (5) the severity level (not working at all or working below specifications) and the unit's performance attribute data.

According to yet another aspect of the present invention, the sewage treatment unit will periodically up-link a system operating status to a central monitor location. If the sewage treatment unit fails to report its operating status within the allocated time, this will cause the computer at the central location to dial up the telephone or transponder number of the unit. If the computer gets a busy signal or no answer, it will continue calling for a preset time until it gets through and interrogates the unit's operating status. If this preset time elapses, it will signal the computer operator in the central monitor station of the missing "status" report. This prevents a catastrophic failure from going undetected. The status report contains specific values for (1) water flow at each part of the system, (2) radiation level, (3) air pressure, (4) water flow rate, (5) if both redundant sensors to detect water levels at the holding tank are working, (6) duration of the scrubbing cycle in the clarifying compartment, and (7) battery voltage.

In summary, the present invention greatly reduces the risk of an accidental discharge of untreated waste water into the environment and offers the municipal government the ability to remotely monitor the operating condition of the home sewage treatment system.

Accordingly, it is an object of the present invention to provide an efficient, reliable, unattended, and automated waste treatment system that can be used in individual homes and commercial businesses in lieu of a large-scale centralized waste treatment plant.

It is another object of the present invention to provide a reliable, unattended, chemical-free and effective system for disinfecting the effluent of a septic tank before it is irrigated into a drain field.

It is still another object of the present invention to provide a complete fault detection and reporting system via telephone or alternatively a transponder through the power lines, to a central municipal monitoring station so that a technician can be dispatched immediately to repair the sewage treatment system.

Further, it is another object of the present invention to provide an automated sewage treatment system incorporating an effluent disinfection medium utilizing, but not limited to either microwave radiation, electrical resistive type water heater, or a gas-fired water heater.

Additionally, it is another object of the present invention to provide an automated home sewage treatment system powered by conventional alternating current (A/C) from the power grid, but one that will automatically switch to direct current (DIC) power from a backup battery during an A/C power failure.

Moreover, it is another object of the present invention to provide a regenerative system for heating the effluent contained in the aerating compartment by transferring to it the heat from the already disinfected water, thereby accelerating bacterial oxidation and decomposition.

It is yet another object of the present invention to provide an alternative use of heat regeneration where the already disinfected hot water exiting the microwave chamber is used to raise the temperature of the clarified water entering the disinfection chamber.

Furthermore, it is another object of the present invention to provide a system for periodically flushing out solids in the clarifying compartment and returning these solids to the septic tank for further digestion.

It is another object of the present invention to limit the internal diameter of the pipe used in the radiation loop to be equal to the effective penetration depth of microwaves in water.

Additionally, it is another object of the present invention to fabricate the radiation loop in a zigzag pattern going up-and-down and back-and-forth within the interior of the microwave chamber so that all the effluent effectively flows through all areas of the chamber. This is done to expose each batch of effluent to the same average level of radiation.

Moreover, it is another object of the present invention to provide dual high-water level detectors in the clarifying compartment of the holding tank. This redundancy insures that a high water level will always be detected, thus preventing an overflow condition by failing to turn on the water pump.

In a similar manner, it is another object of the present invention to provide dual low-water detectors in the clarifying compartment of the holding tank. This redundancy insures that a low water level will always be detected, thus preventing the water pump from running dry.

Finally, it is another object of the present invention to provide a system for automatically reverting operation to a conventional septic tank and drain field sewage treatment system if (1) there is a total electrical power failure, both primary A/C power or back up DC power, or (2) if the water pump fails to operate. This is done to prevent effluent from overflowing out of the holding tank and/or septic tank.

BRIEF DESCRIPTION OF THE SEVERAL VIEWS OF THE DRAWINGS

The above described objectives will become apparent from the detailed description of the drawings set forth below. For illustration purposes, a microwave disinfection medium is used as an example to explain the system operation. However, it will be understood that microwave radiation can be substituted with any other disinfecting medium without departing from the teachings of the present invention.

FIG. 2A is a sectional view through a regenerative heat exchanger shown in FIG. 2.

DETAILED DESCRIPTION OF THE INVENTION

Figure 1:
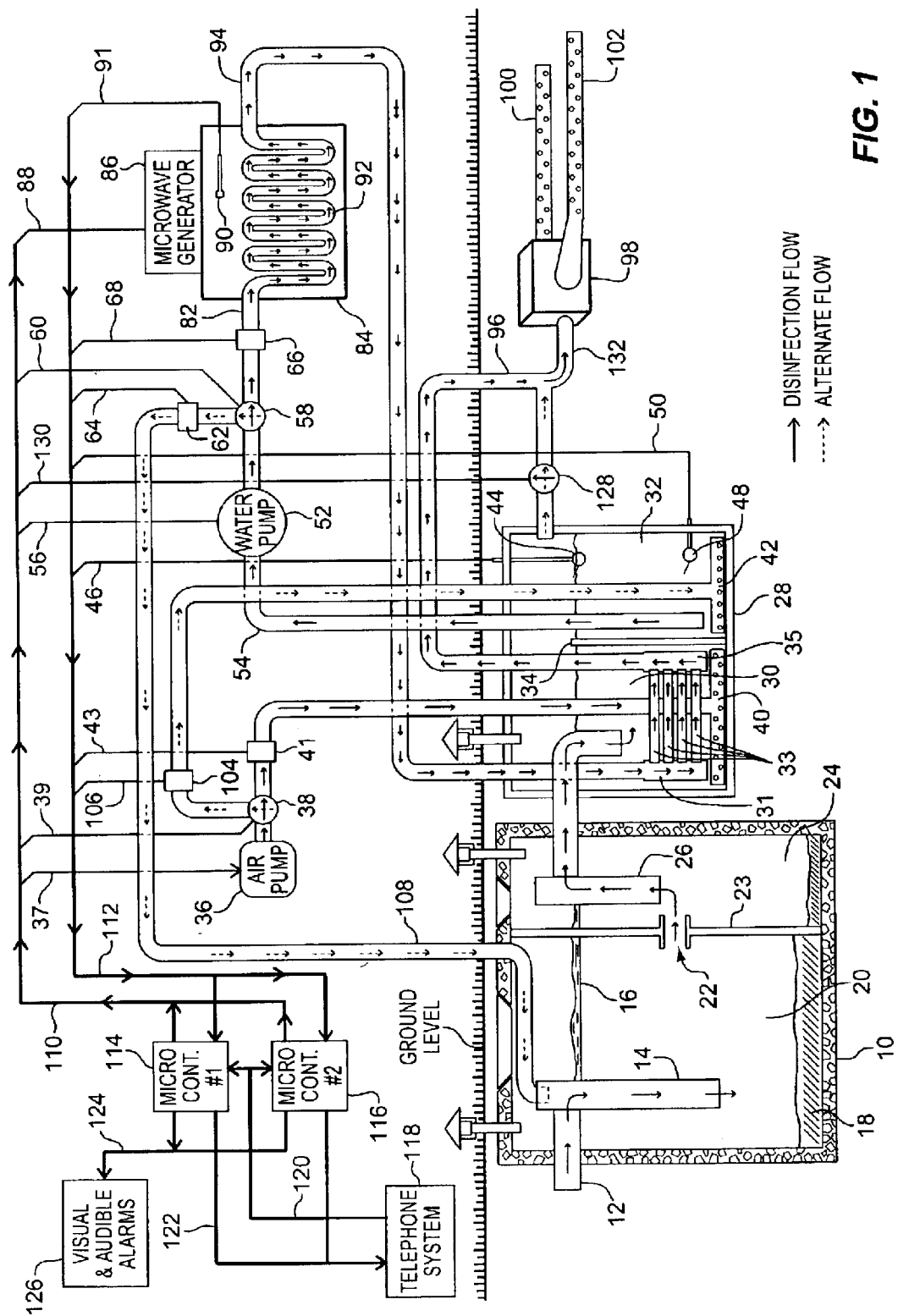
FIG. 1 is a block schematic diagram of one embodiment of the automated sewage treatment system of the present invention and illustrates the following components of the system, namely, (1) a conventional septic tank, (2) an intermediate size holding tank, (3) an air injection system to accelerate sewage digestion and oxidation within the holding tank, (4) an automated flushing system for the holding tank, (5) a disinfection chamber using microwave radiation, (6) a regenerative heat exchanger which transfers heat from the already disinfected water into the effluent at the holding tank, (5) a conventional drain field where the disinfected water is irrigated, (7) a telephone system for automatically reporting any malfunction to a central monitoring station, and (8) a system for reverting to a conventional septic tank and drain field system in case of a total power failure.

What follows is a description of system operation. For illustration purposes a microwave disinfection medium will be used as an example to explain the system operation. However, it will be understood that microwave radiation can be substituted with any other means of water heating without departing from the teachings of the present invention.

In the primary treatment stage in the sewage treatment system of the present invention, raw sewage flows into an ordinary septic tank where solids are allowed to settle to the bottom, the scum rises to the top and anaerobic (oxygen not required) decomposition takes place in the conventional manner known in the art. During the secondary treatment stage, as more household sewage enters the septic tank, clarified water is forced out from the middle of the septic tank and into an aerated holding tank where further aerobic (oxygenated) decomposition takes place at an accelerated rate to biologically reduce the bacterial count. During the tertiary treatment stage, when the clarified water in the holding tank reaches a predetermined high level, it is pumped through the microwave chamber where it is disinfected. Each batch of disinfected, clean water leaving the microwave chamber is irrigated into an underground drain field.

The sewage treatment system of the present invention works under micro-controller command and uses a wired or wireless telephone system to report faults to a central location. The central location station may also interrogate and request systems status on command. A fault detection and diagnostic system include sensors for detecting an inadequate level of microwave energy, water pump failure, failure of the emergency battery or power inverter, air pump failure or micro-controller failure.

Since the clarified water entering the holding tank still may contain minor amounts of suspended solids which will settle at the bottom, the sewage treatment system of the present invention incorporates a system to automatically and periodically flush out the solids and return them to the septic tank for further digestion. This is accomplished by (1) redirecting the air pump pressure into a series of perforated pipes running back and forth at the bottom of the holding tank in order to throughly mix any solids with the water, and (2) redirecting the flow of this stirred-up water from the holding tank back into the septic tank where these solids will settle to the bottom for further digestion. Recycling of stirred-up water continues until all the particulate matter is transferred from the bottom of the holding tank to the bottom of the septic tank.

A regenerative heat exchanger is used to increase the temperature of the effluent that is aerated in the first compartment of the holding tank by absorbing the heat from the already disinfected water. The rate of bacterial oxidation and decomposition is significantly increased at temperatures higher than ambient.

In one embodiment of the sewage treatment system of the present invention, household alternating current (A/C) normally powers the sewage treatment system, but switches to battery power when a grid or household power failure occurs.

In another embodiment of the invention, rechargeable batteries provide the sole power to run the sewage treatment system, such as in remote areas where commercial alternating current is not available but direct current from solar panels or wind generators is available.

In the total absence of any electrical power (both primary A/C and back up DIC), the sewage treatment system of the present invention will revert back to a conventional septic tank and drain field sewage treatment system by automatically opening a valve that allows septic tank effluent to flow directly into the drain field, bypassing the disinfection process. If desired, this feature can be turned-off remotely via the telephone from the municipal monitoring station.

Referring now to the drawings in greater detail, in FIG. 1, primary sewage treatment is shown taking place in a conventional septic tank 10 where heavier solids 18 (sludge) entering the septic tank 10 via inlet pipe 12 and directing baffle pipe 14 are allowed to settle to the bottom of the septic tank 10, the lighter materials 16, composed mostly of soap and fats (scum) floats to the top and anaerobic decomposition takes place in the conventional manner known in the art.

In between the sludge and the scum is a larger layer of clarified water. The septic tank 10 is divided into two compartments 20 and 24 by a baffle 23 with a hole 22 in the middle to allow flow of clarified water from the first compartment 20 into the second compartment 24.

The secondary sewage treatment takes place in a smaller holding tank 28.

As more household sewage enters inlet pipe 12 into the septic tank 10, clarified water is forced out from the middle of the septic tank 10 via a pipe 26 and into a first compartment 30 of the holding tank 28. Here air is injected into the clarified water via a perforated pipe 40 to accelerate aerobic decomposition of the waste. Also, the temperature of this clarified water in the compartment 30 of the holding tank 28 is raised above ambient temperature in order to accelerate the rate of bacterial decomposition and oxidation. This temperature increase is accomplished without consuming any additional power. This is achieved by forcing already disinfected water (in effluent pipe 94 from microwave chamber 84) through heat-exchanger tubes 33 of a heat exchanger 31 before it is discharged into a drain field through perforated pipes 100 and 102.

In the holding tank 28, effluent from the pipe 26 contacts the exterior side of the tubes 33, which absorbs much of the heat from the already disinfected water in the tubes 33 from the effluent pipe 94.

When the clarified water in the second compartment 32 of the holding tank 28 reaches a predetermined high level as, detected by a float sensor 44, a batch of clarified water is pumped via a pipe 54 and a pump 52, through an electromagnetic valve 58 and via an inlet pipe 82 into and through a microwave chamber 84 where it is disinfected. This process continues until all of the clarified water in the second compartment 32 of the holding tank 28 reaches a predetermined low level as detected by sensor 48. At this point, electromagnetic valves 38 and 58 are switched to an "alternate" flow mode by a micro-controller 114/116. This results in air jets flushing the solid particles off the bottom of compartment 32 of the holding tank 28 while at the same time the water (along with the suspended solids) in this compartment 32 is recycled through pipe 54, valve 58, water flow sensor 62 and pipe 108 back to the septic tank 10 for further digestion.

The water returned to the septic tank 10 pushes out the same volume of clarified water back into holding tank 28. This scrubbing/recycling of the sludge is limited by microcontrollers 114/116 to a maximum of 20 minutes, unless the water in the compartment 32 reaches a high level set by the float sensor 44, in which case a new disinfection cycle will start immediately.

When more raw sewage in the pipe 12 enters septic tank 10 via directing baffle pipe 14, the same volume of clarified water moves by gravity into the holding tank 28. As this occurs, previously aerated water in the compartment 30 will flow over a wall or weir 34, refilling the compartment 32 up to the predetermined high level of water set by the float sensor 44. At this point, the pump 52 is activated to disinfect and empty the next batch of effluent in the compartment 32.

As shown, micro-controllers 114/116 are connected back-to-back in a co-sharing arrangement in which one is the "operator" and the other is the "supervisor." In this co-sharing arrangement the "supervisor" validates each step that the "operator" makes. If the "operator" makes one single error, then the "supervisor" will (1) turn the power off to the micro-controller acting as the "operator," (2) become the only operator and (3) report the micro-controller failure to the central location so that it can dispatch a repair technician to the household. This co-sharing arrangement is explained in full detail in the description of FIG's. 7A and 7B.

Figure 2:
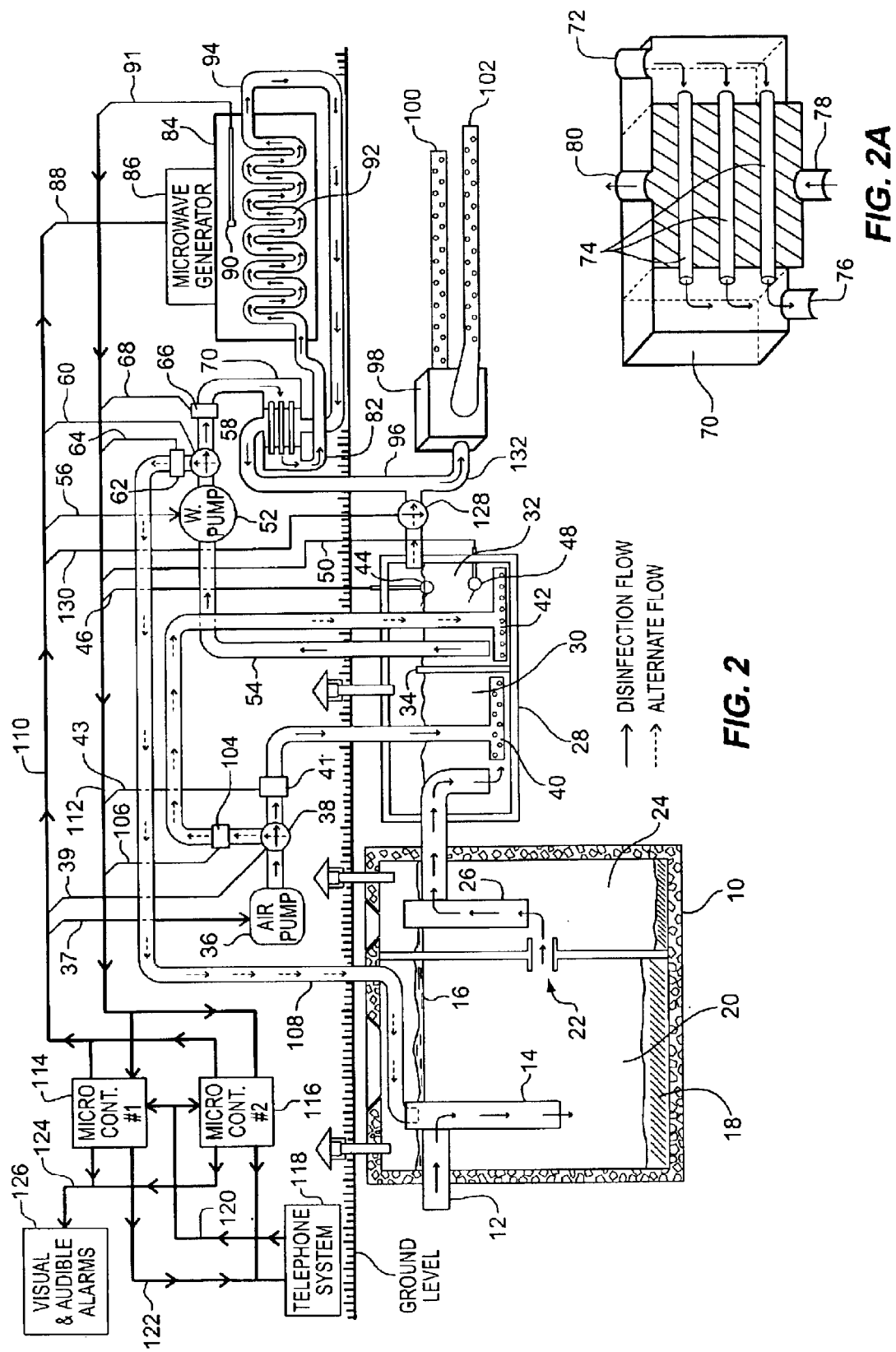
FIG. 2 is a block schematic diagram of another embodiment of the automated sewage treatment system constructed according to the teachings of the present invention and illustrates the following components of the system, namely, (1) a conventional septic tank, (2) an intermediate size holding tank, (3) an air injection system to accelerate sewage digestion and oxidation within the holding tank, (4) an automated flushing system for the holding tank, (3) a disinfection chamber using microwave radiation, (5) a regenerative heat exchanger which transfers heat from the already disinfected water into the effluent entering the disinfection chamber, (6) a conventional drain field where the disinfected water is irrigated, (7) a telephone system for automatically reporting any malfunction to a central monitoring station, and (8) a system for reverting to a conventional septic tank and drain field system in case of a total power failure.

Referring to FIG. 2, the sewage treatment cycle illustrated therein is very similar to the sewage treatment cycle illustrated in FIG. 1, except for the following.

The heat exchanger 31 including pipes 33, has been removed from the holding tank 28 and relocated as a regenerative heat exchanger 70 to a location just before the inlet pipe 82 to the microwave chamber 84 in order to preheat the effluent prior to disinfection of the effluent water by microwave radiation in the microwave chamber 84.

As shown in FIG. 2, the regenerative heat exchanger 70 is used to preheat the effluent entering the microwave chamber 84 by transferring heat from the already disinfected water in effluent pipe 94 to the clarified effluent water entering the microwave chamber 84. The objective is to increase the temperature of the effluent flowing into the microwave chamber 84 to a temperature above the microbial inactivation temperature, thereby reducing the time required for disinfection which in turn allows for a greater disinfection flow rate.

As shown in FIG. 2A, the heat exchanger 70 works as follows. Disinfected hot water enters through port 72 and flows through the inside of tubes 74 toward exit port 76, while infected water enters through port 78 and flows around the outside of tubes 74 toward exit port 80. In this manner, the heat in the disinfected water flowing through the inside of tubes 74 is transferred to the non-disinfected water flowing around the outside of tubes 74. This cooled and disinfected water is then fed via pipe 96, and distribution box 98 to the perforated pipes 100 and 102 for dispensing into a conventional underground drain field.

The operation of the entire sewage treatment system is regulated by microcontrollers 114/116 which monitor a number of sensors (41, 44, 48, 62, 66, 90 and 104) to (a) insure that each part of the system is functioning properly and (b) immediately report any malfunction, via a telephone system 118, to a central location used by the local municipality to monitor the operating status of thousands of individual home sewage treatment units employing the sewage treatment system of the present invention. These microcontrollers 114/116 also activate the air pump 36, the water pump 52, the microwave generator 86, and three valves 38, 58 and 128 which control the direction of water and air flow. These two micro-controllers 114/116 are connected back-to-back in a co-sharing arrangement so that during one cycle of disinfection one micro-controller 114 or 116 functions as the "operator" and the other as the "supervisor." On the next disinfection cycle, they swap functions and the previous "operator" becomes the "supervisor" and the previous "supervisor" becomes the "operator." If at any time the "operator" fails to correctly perform any one task, the "supervisor" will (1) detect it, (2) report this failure to the central location, (3) turn off the malfunctioning micro-controller 116 or 114 and (4) become the only "operator" until the malfunctioning micro-controller 116 or 114 is replaced.

The air pump 36 in FIG. 2 is used to inject air via perforated pipe 40 into the clarified water in compartment 30 of holding tank 28. During activation of the air pump 36 by micro-controllers 114/116, air sensors 41 or 104 detect if the air pressure from the pump 36 falls below a predetermined level. If it does, a fault signal is sent via wire conductors 43 or 106 to the micro-controllers 114/116 which in turn will (a) activate an audible and visual alarm 126 to alert the home owner, and (b) report the malfunction via the telephone system 118 to the central location used by the municipality or county to monitor a number of home sewage treatment systems.

The water pump 52 is used to pump the clarified water in the second compartment 32 of the holding tank 28 and pass this water through a winding loop of microwave-absorbing pipe 92 inside the microwave chamber 84. The water pump 52 is activated by micro-controllers 114/116 any time that high the water sensor 44 detects a full condition in the compartment 32 of the holding tank 28. During operation of the water pump 52 by the micro-controller 114/116, water flow sensors 62 or 66 detect if the flow rate from the pump 52 falls below a predetermined level. If it does, a fault signal is sent via wire conductors 64 or 68 to the micro-controller 114/116 which in turn will activate audible and visual alarms 126 and report the malfunction to the central location as previously described.

Microwave generator 86 is used to disinfect the effluent water from septic tank 10 before such water is dispersed into a conventional drain field. This microwave generator 86 is turned on automatically, along with the pump 52, upon activation of the high water sensor 44. The water flow rate through the microwave chamber 84 is precisely regulated by micro-controller 114/116 to the value required to ensure complete bacteria kill. This flow rate is controlled by turning on and off the water pump 52, as required, to obtain a zero count for coliform and *E. coli* as determined during the research and development testing of the sewage treatment system of the present invention. However, it is appreciated that bacteria kill rates are not only a function of the speed that the effluent flows through the microwave chamber 84, but also as a function of the microwave power intensity which may degrade as the unit ages. Therefore, a microwave energy sensor 90 is incorporated into the microwave chamber 84 to measure the actual level of microwave power being produced. As the field strength decreases with age, the flow rate is proportionally decreased to compensate.

During operation of the microwave generator 86 by micro-controller 114/116, the microwave sensor 90 will provide a voltage level equivalent to the measured field strength to a D/A port 14 (FIG. 7) of the micro-controller 114/116. If it falls below a predetermined minimum level, micro-controllers 114/116 will activate an audible and visual alarm 126 and report the malfunction to the central location as described above.

Referring again to FIGS. 1 and 2, periodically micro-controller 114/116 will switch to +12 VDC via wire conductors 39 and 60. This will switch the valves 38 and 58 to the "flushing" position causing (1) air to be directed toward the bottom of the second compartment 30 in the holding tank 28 in order to stir up any sludge and (2) recycling water between holding tank 28 and the septic tank 10, allowing suspended particles to be returned and settle to the bottom of the septic tank 10.

Again referring to FIGS. 1 and 2, a two-way electromagnetic dump valve 128 is normally in the closed position because it is energized by micro-controller 114/116 constantly applying +12 VDC to wire conductor 130. In case of a complete power failure (A/C and D/C), the voltage on the wire conductor 130 will drop to zero causing the dump valve 128 switch to the open position by spring pressure. This allows for septic tank effluent to be directed to the drain field, thus preventing overflow of the septic tank 10. This feature can be disabled or enabled from the municipal central location via the telephone system 118.

Figure 3:
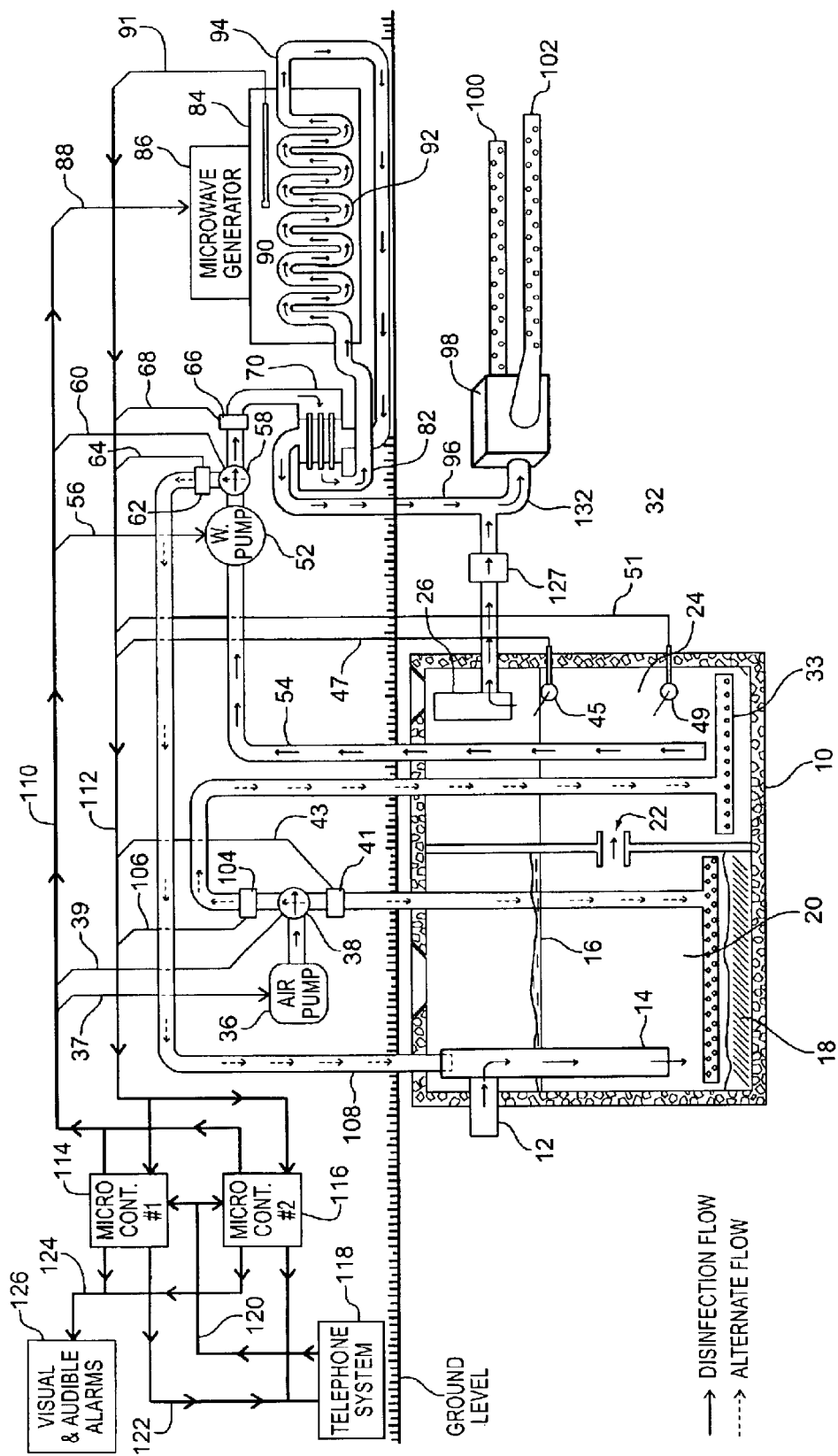
FIG. 3 is a block schematic diagram of yet another embodiment of the automated sewage treatment system constructed according to the teachings of the present invention and illustrates the following components of the system, namely, (1) a conventional septic tank, (2) an air injection system to accelerate sewage digestion and oxidation within the septic tank, (3) an automated flushing system for the septic tank to further reduce suspended particles in the effluent. (4) a disinfection chamber using microwave radiation, (5) a regenerative heat exchanger which transfers heat from the already disinfected water into the effluent entering the disinfection chamber, (6) a conventional drain field where the disinfected water is irrigated, (7) a telephone system for automatically reporting any malfunction to a central monitoring station, and (8) a system for reverting to a conventional septic tank and drain field system in case of a total power failure. This embodiment is similar to the embodiment shown in FIG. 2 except that (1) the holding tank and dump valve are deleted, (2) the aeration of the sewage takes place in the first compartment of the septic tank and (3) flushing of suspended particles takes place in the second compartment of the septic tank.

Referring to FIG. 3, a third sewage treatment system constructed according to the teachings of the present invention is shown therein. Note that (1) the holding tank 28 and the dump valve 128 have been eliminated, (2) sewage aeration now takes place in the first compartment of the septic tank 10 and (3) flushing of suspended particles now is done in the second chamber 24 of the septic tank 10. The effluent to be disinfected is pumped-out from the septic tank's second compartment 24 because it contains mostly clarified water. During the "flushing cycle" of the second compartment 24 the suspended particles are recycled back into the first compartment 20 for further digestion and oxidation. A disinfection cycle is triggered upon the water level in the second compartment 24 reaching a predetermined high level set by sensor 45. This starts pumping of the effluent through the microwave chamber 84 until the water reaches a predetermined low level set by sensor 49. The system shown in FIG. 3 is more cost effective than those systems shown in FIGS. 1 and 2 because the holding tank 28 and the dump valve 128 are eliminated, resulting in a more economical installation. Those two components are relatively expensive to install because it requires digging-out a large hole in the ground.

Note that the dump valve 128 shown in FIGS. 1 and 2 is replaced with a check valve 127 in FIG. 3 that only allows water to flow out toward the drain field. However, the configurations in FIGS. 1 and 2 will do a better job of removing solids from the effluent prior to disinfection, because the two compartments 30 and 32 in the holding tank 28 act as second and third clarifier compartments.

Figure 4:
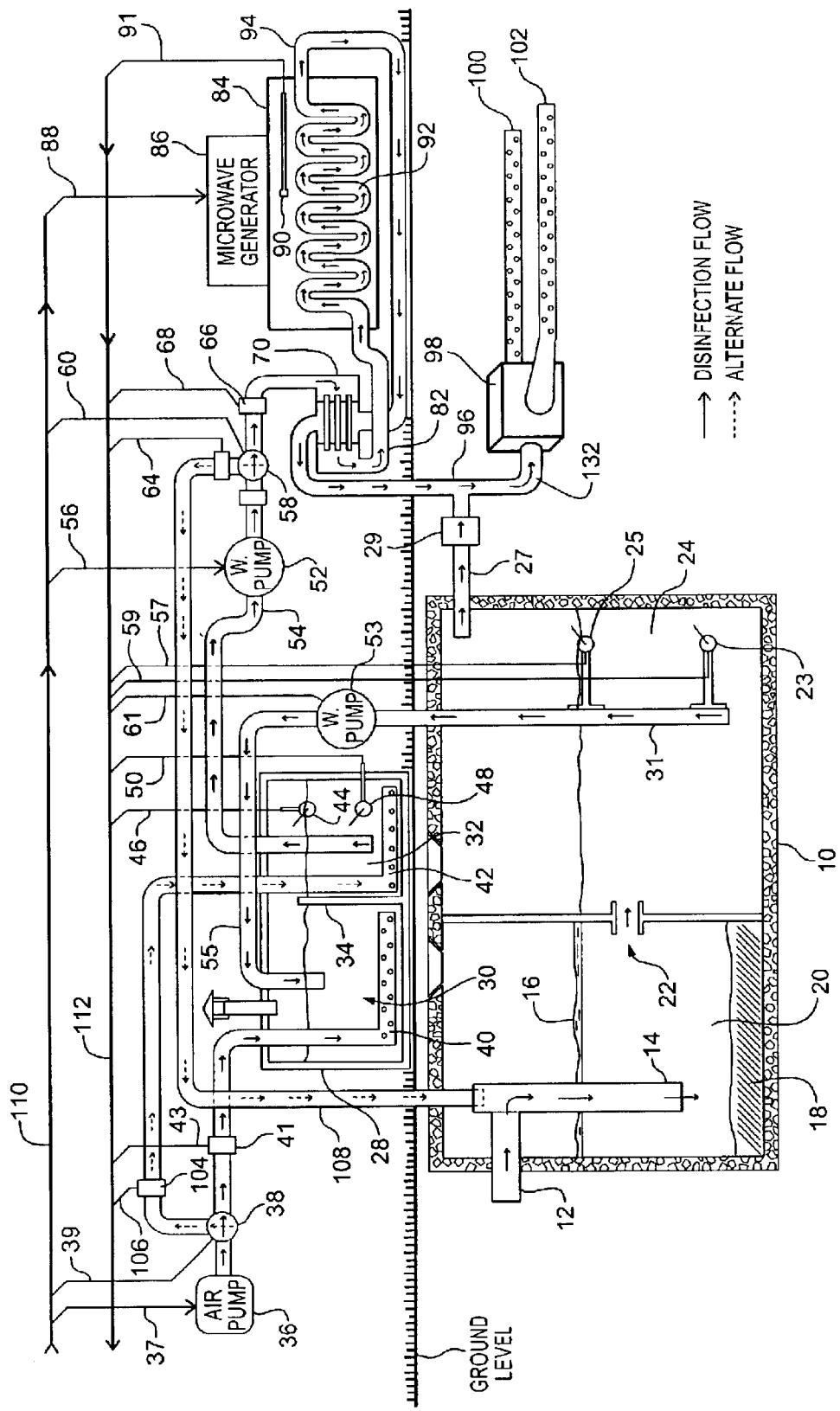
FIG. 4 is a block schematic diagram of still another embodiment of the automated sewage treatment system constructed according to the teachings of the present invention which is similar to the embodiment shown in FIG. 2 with the following changes: (1) The holding tank is relocated to above the ground and (2) a second water pump is added to pump effluent from the septic tank into the holding tank.

Referring to FIG. 4, a fourth sewage treatment system constructed according to the teachings of the present invention is shown therein. Note that the sewage treatment system shown in FIG. 4 is very similar to the system shown in FIG, but with the following changes: (1) The holding tank 28 is relocated to above the ground, (2) a second water pump 53 is added to the pump 52 to pump effluent from the septic tank 10 into the holding tank 28, and (3) the dump valve 128 is replaced with a check valve 29 in an outlet pipe 27 that only allows outgoing flow. The disinfection cycle is triggered when the waste in the compartment 24 reaches a predetermined high level set by sensor 25. This turns on water pump 53 until the effluent in the compartment 32 reaches the predetermined high level set by sensor 44. Then the water pump 52 is turned on to disinfect this batch of effluent until the effluent in compartment 32 reaches the predetermined low level set by sensor 48. At this point, compartments 30 and 32 are refilled with effluent and subsequently this batch of effluent is disinfected. This "refill and disinfect process" will repeat as many times as required until the waste in the compartment 24 reaches the predetermined low level set by the low level sensor 23. During this time, the effluent in the compartment 30 is being aerated to accelerate oxidation of the bacteria. This system is more economical to install because it eliminates the need to dig a large hole in the ground to accomodate the holding tank 28.

Figure 5:
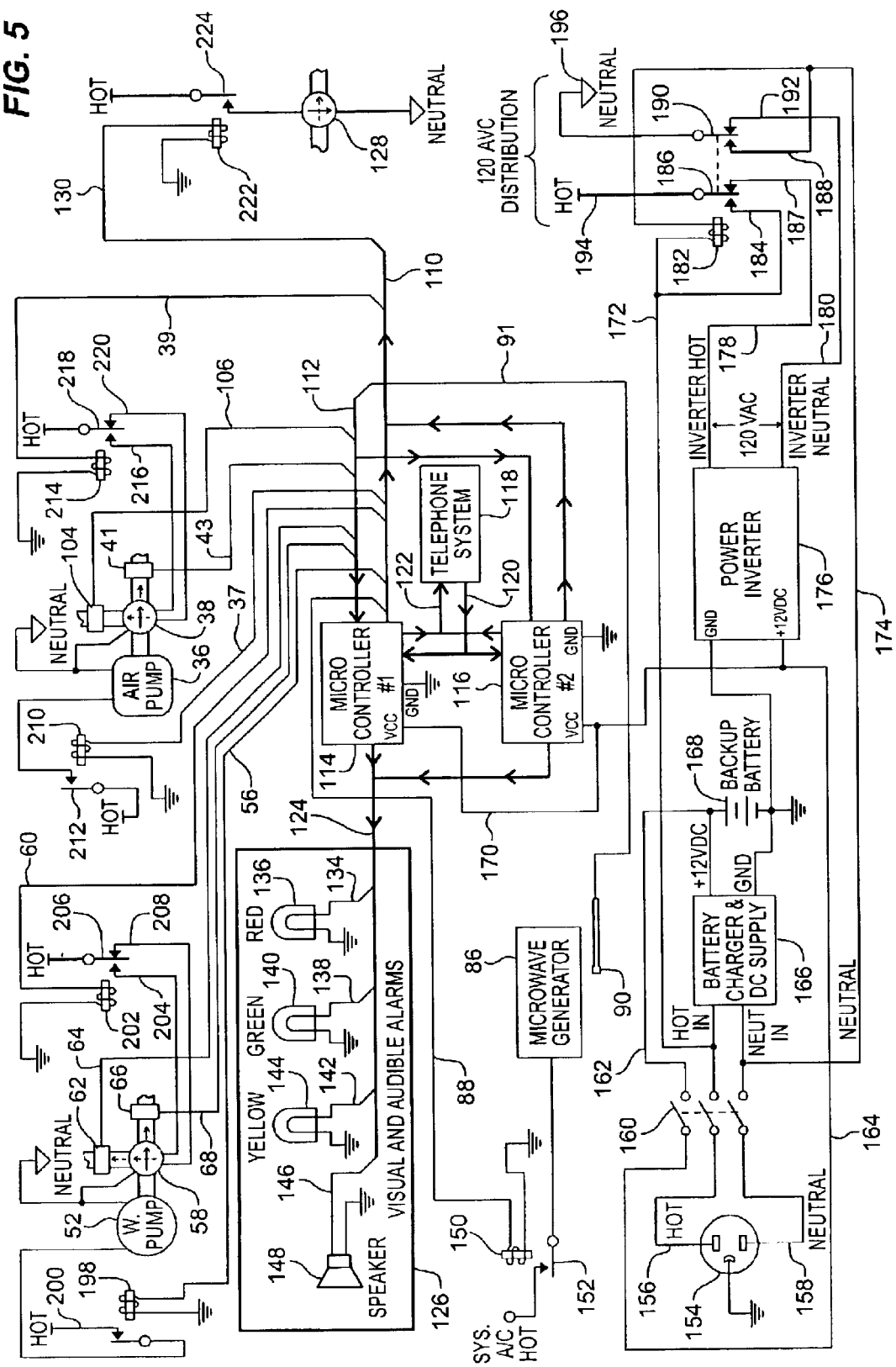
FIG. 5 is an electrical schematic diagram of the control system used to (a) regulate the disinfection process, (b) regulate the flushing cycle, (c) monitor fault sensors, (d) charge the back up battery and (e) report the operating status of the system to a central location.

Referring to FIG. 5, there is illustrated therein an electrical schematic circuit diagram for the sewage system regulation circuit constructed according to the teachings of the present invention. The sewage treatment system is regulated by a micro-controllers 114/116 and uses a wired or wireless telephone system 118 to report faults to a central location. The central location may also interrogate the unit status on command. The fault detection and diagnostic system include sensor 90 for detecting an inadequate field strength, sensors 62 and 66 for detecting a water pump failure, and sensors 41 and 104 to detect an air pump failure. The voltage at a battery 168 is measured by an AND converter internal to the micro-controller 114/116 which periodically samples the voltage on a wire conductor 170, thereby detecting a low battery condition.

In one embodiment of the sewage treatment system of the present invention, household alternating current from an AC source 154 normally powers the sewage treatment system, but switches to power from rechargeable battery 168 when a power grid or household power failure occurs.

In another embodiment (not shown) of the sewage treatment system of the present invention, the battery 168 can be continually recharged by a conventional wind mill or solar panels to provide the sole power to run the sewage treatment system.

The sewage treatment system incorporates a "system status panel" 126 with visual and audible alarms 134–148 to alert the resident when a faulty condition occurs.

Referring again to FIG. 4, micro-controller 114/116 periodically samples its input ports for fault conditions which may cause the sewage treatment system to operate improperly. A bus 112 carries to micro-controller 114/116 all the fault signals. The bus 110 carries the output signals employed by micro-controller 114/116 to alert the central municipal monitoring station of a possible system failure. A bus 124 carries the output signals generated by the micro-controller 114/116 to alert the home-owner of a possible system failure. When the system is operating properly, micro-controller 114/116 will cause wire conductor 138 to be at +12 VDC which turns on a green light 140. However, if a fault is detected, micro-controller 114/116 will cause wire conductor 134 to switch to +12 VDC that turns on red light 136. At the same time, wire conductor 138 is switched to ground by micro-controllers 114/116, turning off green light 140. Also, wire conductor 146 is switched to +12 VDC turning on audible alarm 148. This audible alarm may be best located inside the home so that neighbors are not disturbed. When microwave generator 86 is activated, sensor 90 will provide a voltage to the micro-controller 114/116 which is proportional to the intensity of the field strength. If the field strength falls below a predetermined low level, the micro-controller 114/116 will turn on a red light 136, turn off the green light 140 and turn on the audible alarm 148.

When the water pump 52 is activated, water flow sensors 62 and 66 will provide a "high" signal to micro-controllers 114/116 via wire conductors 64 and 68 if the flow rate is above a predetermined value. If the flow rate falls below the predetermined value, micro-controller 114/116 will turn on the red light 136, turn off the green light 140 and turn on an audible alarm 148. Similarly, when air pump 36 is activated, air pressure sensors 41 and 104 will provide a "high" signal to micro-controllers 114/116 via wire conductors 43 and 106 if the pressure is above a predetermined high value. If the pressure falls below the high value, micro-controller 114/116 will turn on the red light 136, turn off the green light 140 and turn on the audible alarm 148. Also, when any of the above faults are detected, micro-controller 114/116 via the telephone system 118 will automatically dial the number for the central location and report the malfunction as previously described.

Again referring to FIG. 5, two-way electromagnetic valves 38 and 58 are periodically switched to the "alternate" position by micro-controller 114/116 in order to redirect the flow of water and air, respectively, and scrub out and return to the septic tank 10 any fine particles that may have settled at the bottom of the holding tank 28. Periodically, micro-controller 114/116 will switch +12 VDC to wire conductors 39 and 60. This will turn valves 38 and 58 to the "alternate" position causing (1) air to be directed toward the bottom of the holding tank 28 in order to stir up any sludge and (2) recycle water between holding tank 28 and septic tank 10, allowing the particulate matter to be returned to and settle at the bottom of the septic tank 10. Once the flushing operation is over, micro-controller 114/116 will switch wire conductors 39 and 60 to ground, returning valves 58 and 38 to the normal "disinfection" position.

Once again referring to FIG. 5, the sewage treatment system incorporates switching circuitry for automatically switching to battery power during an A/C power failure either on the power grid or in the home. Alternating current (A/C) from the residence enters the system via a male plug 154. This main A/C power is applied to battery charger 166, which maintains battery 168 at full charge all the time. This battery powers inverter 176, which in turn supplies A/C power to the sewage treatment system during a household or grid power failure. If a power failure occurs at the household or the power grid, A/C power is switched from main A/C (household) to inverter A/C power. When the system receives grid or household A/C power, relay 182 is energized via wires 172 and 174. This closes contacts 184 and 186, passing "home A/C hot" to a system A/C "hot" bus 194. Similarly, contacts 188 and 190 are closed while relay 182 is energized, passing "home A/C neutral" to a system A/C "neutral" bus 196. However, if a grid or household power failure occurs, relay 182 will de-energize and its contacts will return to the normally closed position. This will close contacts 186 and 187 passing "inverter A/C hot" to system A/C "hot" bus 194, and also close contacts 192 and 190 passing "inverter A/C neutral" to system A/C "neutral" bus 196.

Still, referring to FIG. 5, relay 222 is normally energized keeping dump valve 128 in the closed position. In this manner the septic effluent is directed toward the disinfection chamber before being discharged into the drain field. If a total power failure occurs (neither A/C or D/C back up power is available), relay 222 will be dropped and relay contacts 224 will open causing valve 128 to turn by spring pressure to the open position. This will allow septic effluent to be directly dumped into the drain field, thus preventing the septic tank from overflowing. This feature can be disabled and enabled from the municipal central location via the telephone system.

Figure 6:
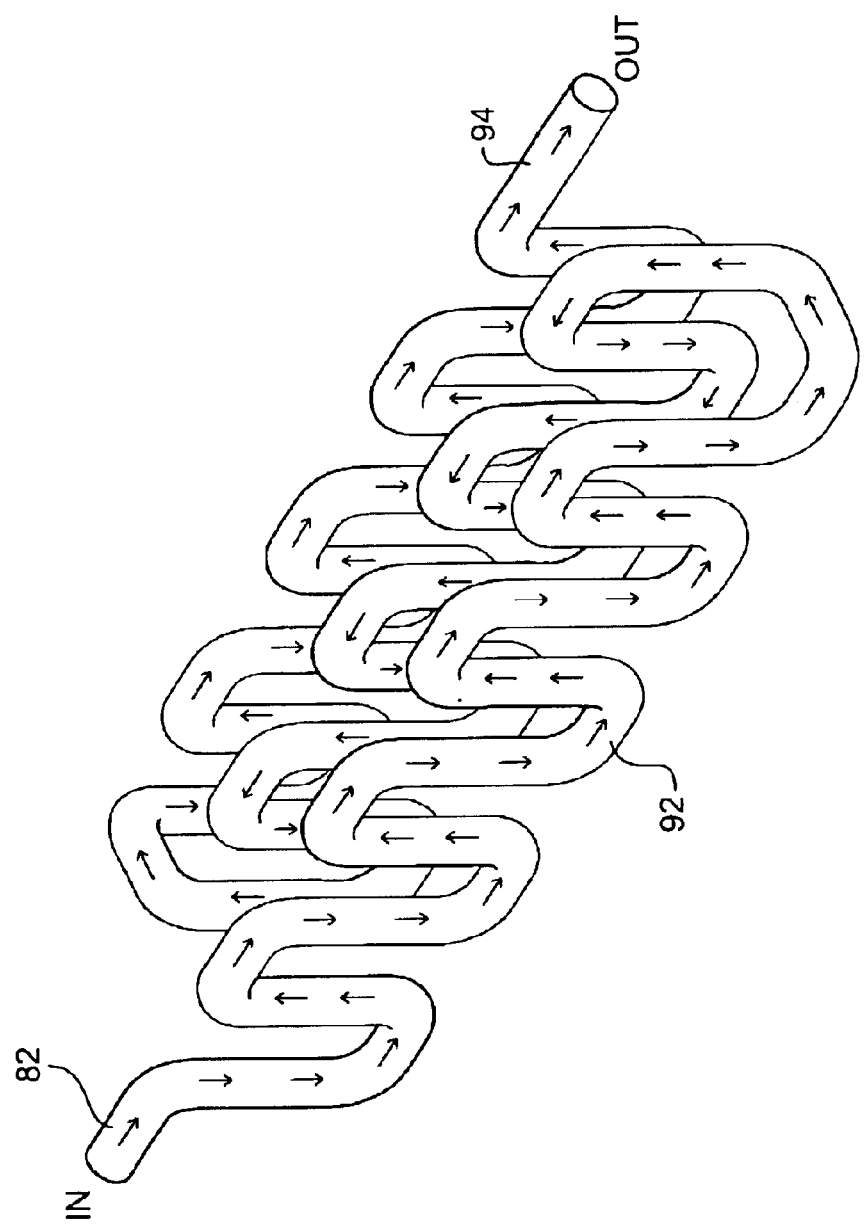
FIG. 6 is a perspective view of a continuously winding loop of microwave-absorbing tubing which results in very large length-to-diameter ratio. This is necessary due to the microwaves relative shallow penetration of water. During the disinfection cycle the effluent is forced to flow through most of the interior volume of the microwave chamber.

Referring to FIG. 6, a perspective view of a "radiation loop" 92 of tubing or pipe is shown therein. This "radiation loop" 92 is made from radiation absorbing pipe material having an internal diameter not exceeding the effective penetration of microwaves into water (about 2 inches). Effluent enters through pipe 82, flows through loop 92 and then disinfected water exits through pipe 94. The pipe length 92 is formed so that it travels up-and-down and back-and-forth to cover as much of the interior volume within the microwave chamber 84 as possible. This twisting pattern effectively results in an extremely long radiation pipe, permitting microwave treatment of effluent at a relatively high flow rate.

Figure 7:
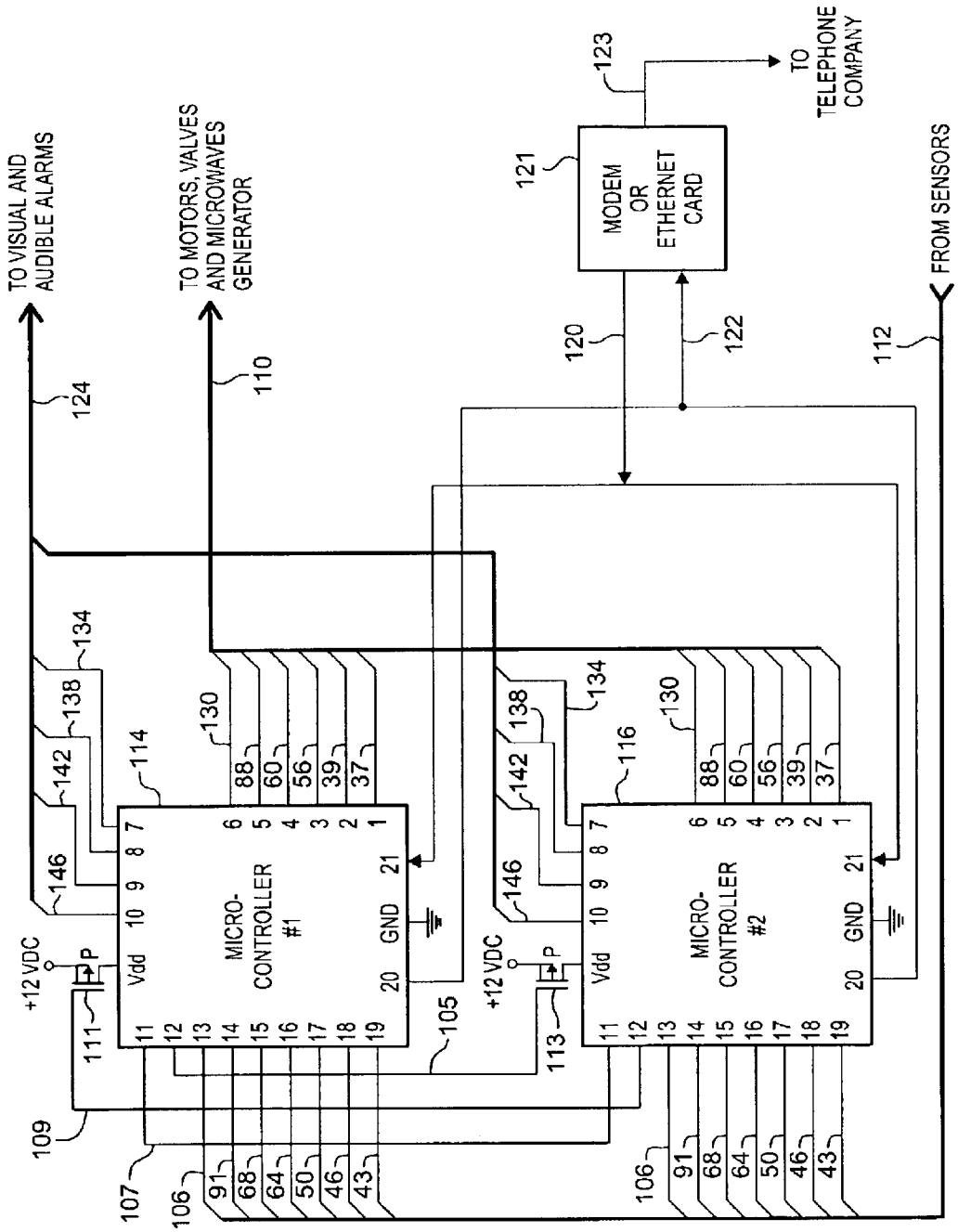
FIG. 7 is an electrical schematic of two co-sharing micro-controllers and their connections to a modem or an Ethernet card and the telephone company to report system status to a central location. To prevent system failure due to a micro-controller malfunction, two co-sharing micro-controllers are connected back to back, one functioning as the system "operator" and the other as the "supervisor" to validate each process taken by the system "operator."

Referring to FIG. 7, an electrical schematic circuit diagram for the co-sharing micro-controllers 114/116 is shown. The micro-controllers 114 and 116 are connected back to back so that all the inputs and outputs are connected to both micro-controllers 114/116. Also, the Vdd power input to each micro-controller 114/116 is provided via P channel transistors 111 and 113. During one cycle of disinfection micro-controller 114 performs the "operator" function while micro-controller 116 performs the "supervisor" function by validating each program step that micro-controller 114 takes. During the next disinfection cycle the roles are reversed and micro-controller 114 becomes the "supervisor" while micro-controller 116 becomes the "operator." Since both micro-controllers use the same software, the "supervisor" knows exactly what is the next step that the "operator" should take. For example, if micro-controller 114 while being the "operator" makes one single mistake, then micro-controller 116 will detect it and will (1) switch wire 109 to +12 VDC to turn off transistor 111 which will to turn off the Vdd power to micro-controller 114, (2) become the only "operator" until 114 is replaced, and (3) dial-up the central location phone number and report the failure of 114.

Wire 107 connects input/output port 11 of both micro-controllers together. Port 11 in the "operator" micro-controller 114 is set by the software as an output port, while port 11 in the "supervisor" micro-controller 116 is set as an input. When port 11 is set high by the "operator" micro-controller 114, it commands the other micro-controller 116 to become the "supervisor."

Bus 110 regulates all the power drivers to control motors, valves and the microwave generator 86. Bus 112 carries to the micro-controllers 114/116 all the signals from a variety of sensors employed to monitor system operation. Bus 124 regulates all the visual and audible alarms to alert the home owner of any malfunction. Bus 122 is used by either micro-controller 114/116 for commanding an Ethernet Card to dial the phone number of the central location and for transmitting outgoing data. Buss 120 is used by the Ethernet Card to transmit incoming data to either micro-controller 114/116.

Figure 8A:
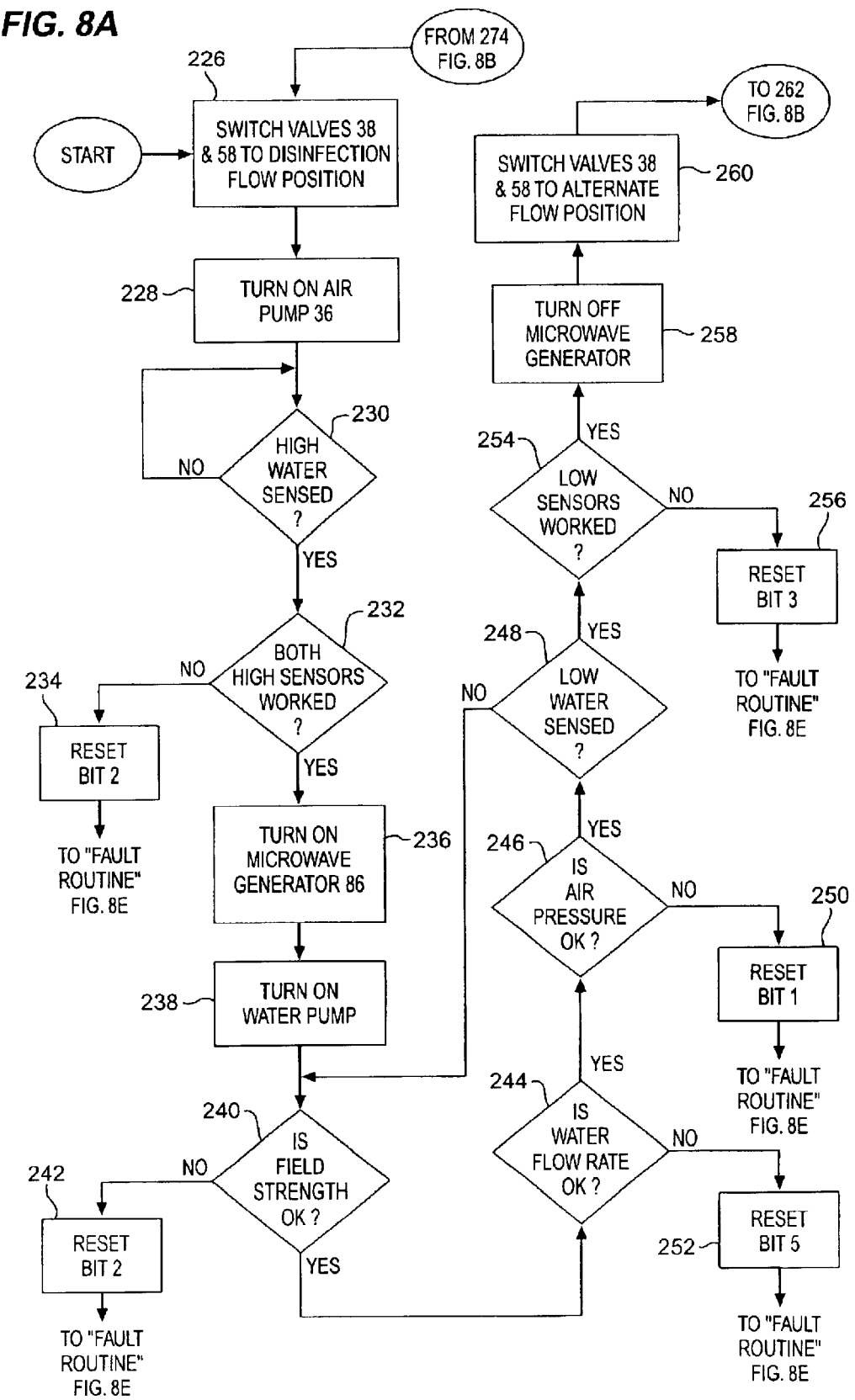
FIG. 8A is a software flow diagram of the steps performed by the micro-controller functioning as the "operator." It illustrates the software flow diagram for (1) regulating the different motors and electromagnetic valves, (2) monitoring the different fault sensor, and (3) for jumping into the "fault reporting routine" shown in FIG. 8C in case a fault is detected.
Figure 8B:
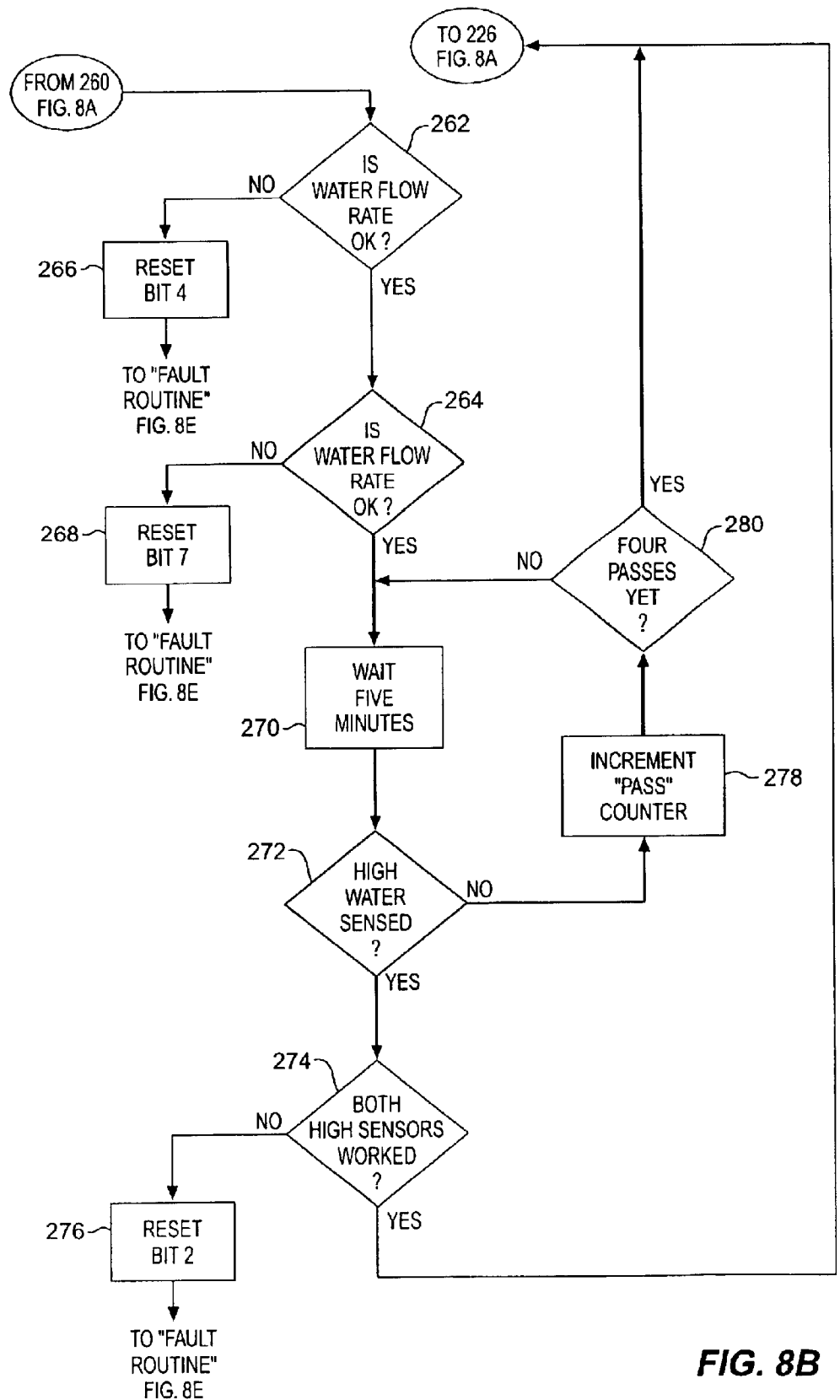
FIG. 8B is the software flow diagram of the steps performed by the micro-controller functioning as the "supervisor." It illustrates the software flow diagram for validating each step that the "operator" micro-controller makes, and in case of a faulty "operator" (1), for powering down the "operator" micro-controller and disconnecting same and (2) for jumping into the "fault reporting routine" shown in FIG. 8C.
Figure 8C:
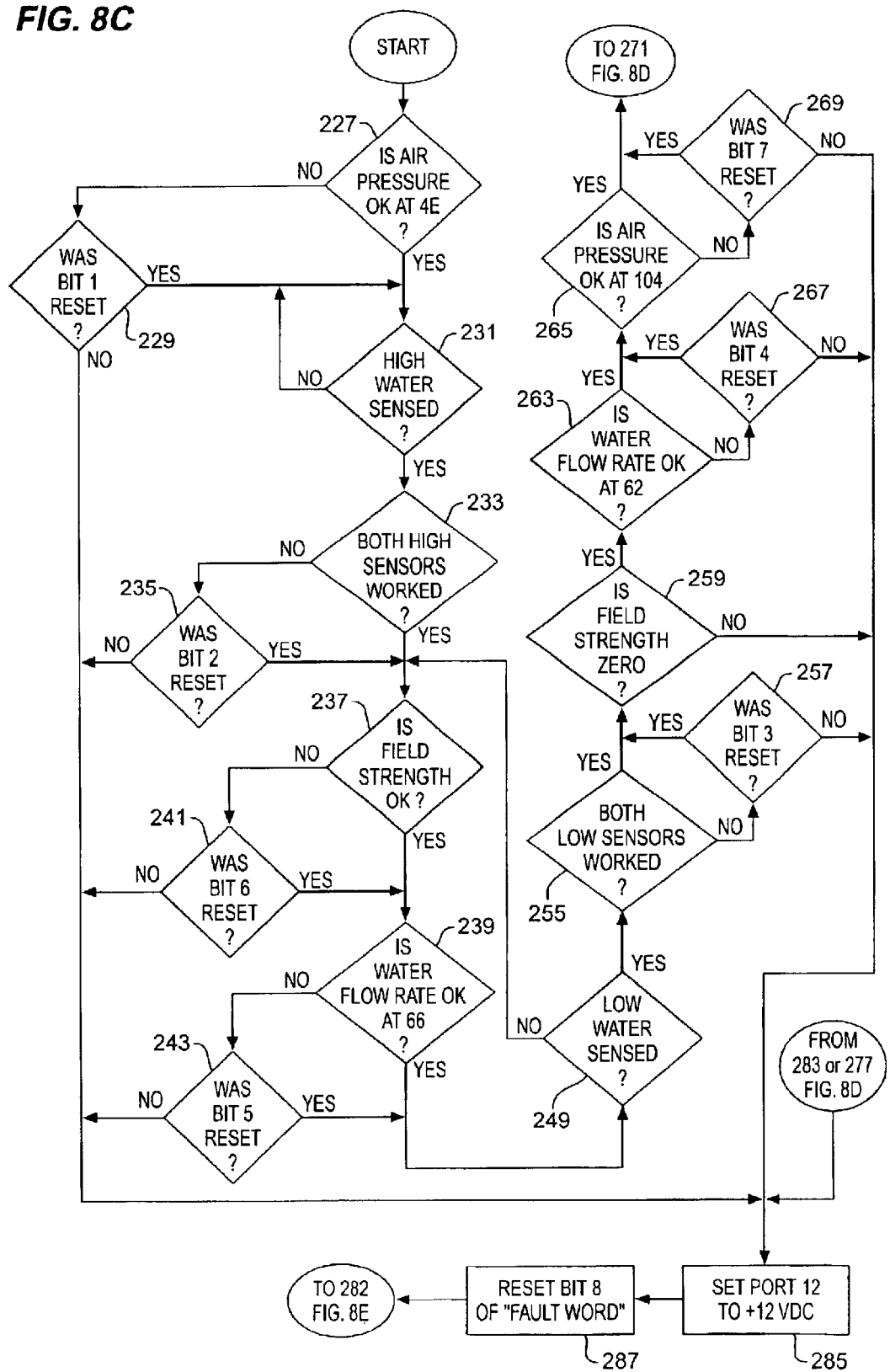
FIG. 8C is the software flow diagram of the steps performed in a "fault reporting routine" to (1) report any faults to the central location so that it may dispatch a repair technician to the reporting residence and, in case that a telephone connection is not established within a reasonable time (such as two hours), to revert the sewage treatment system to a conventional septic tank and drain field system.
Figure 8D:
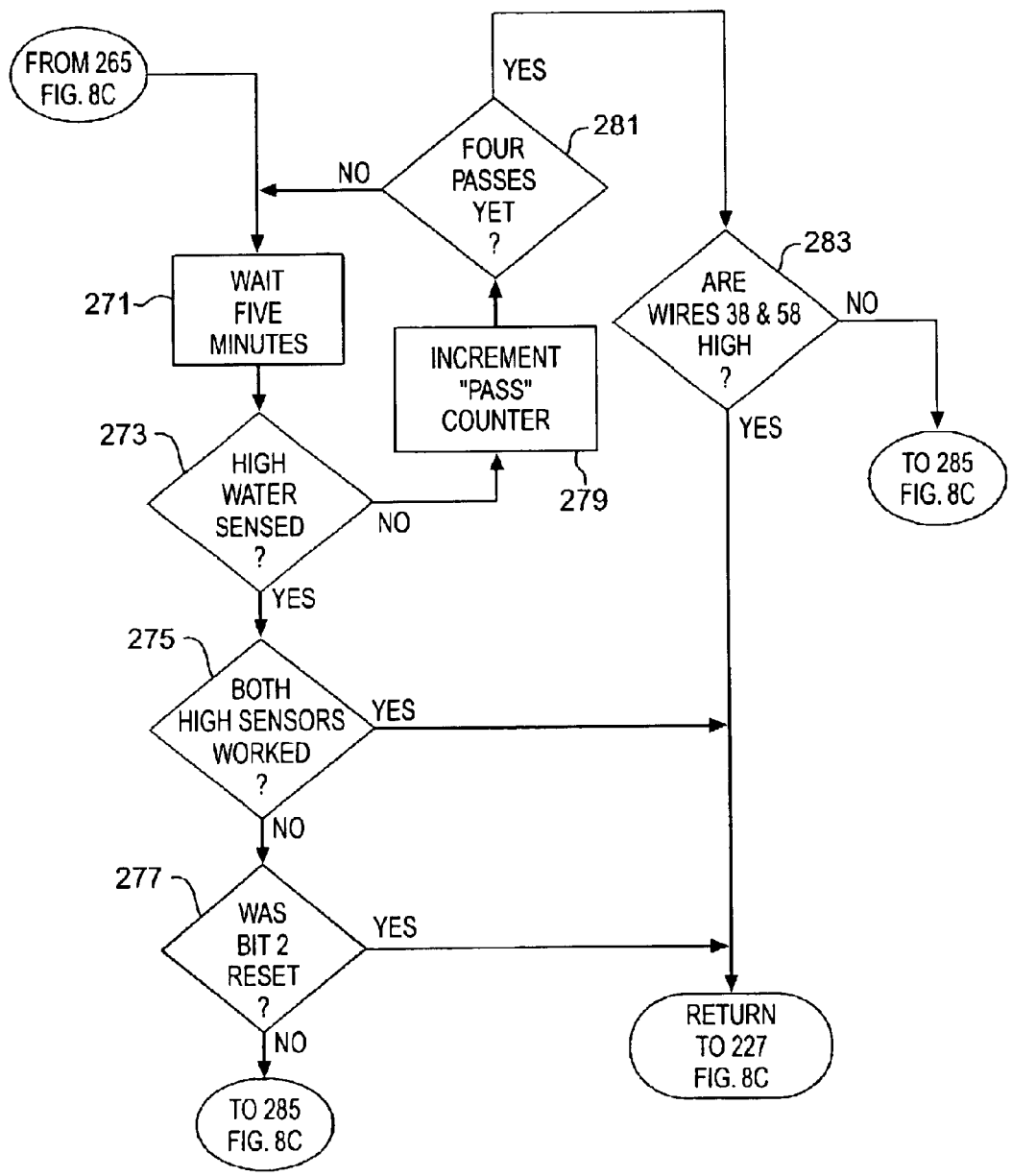
Figure 8E:
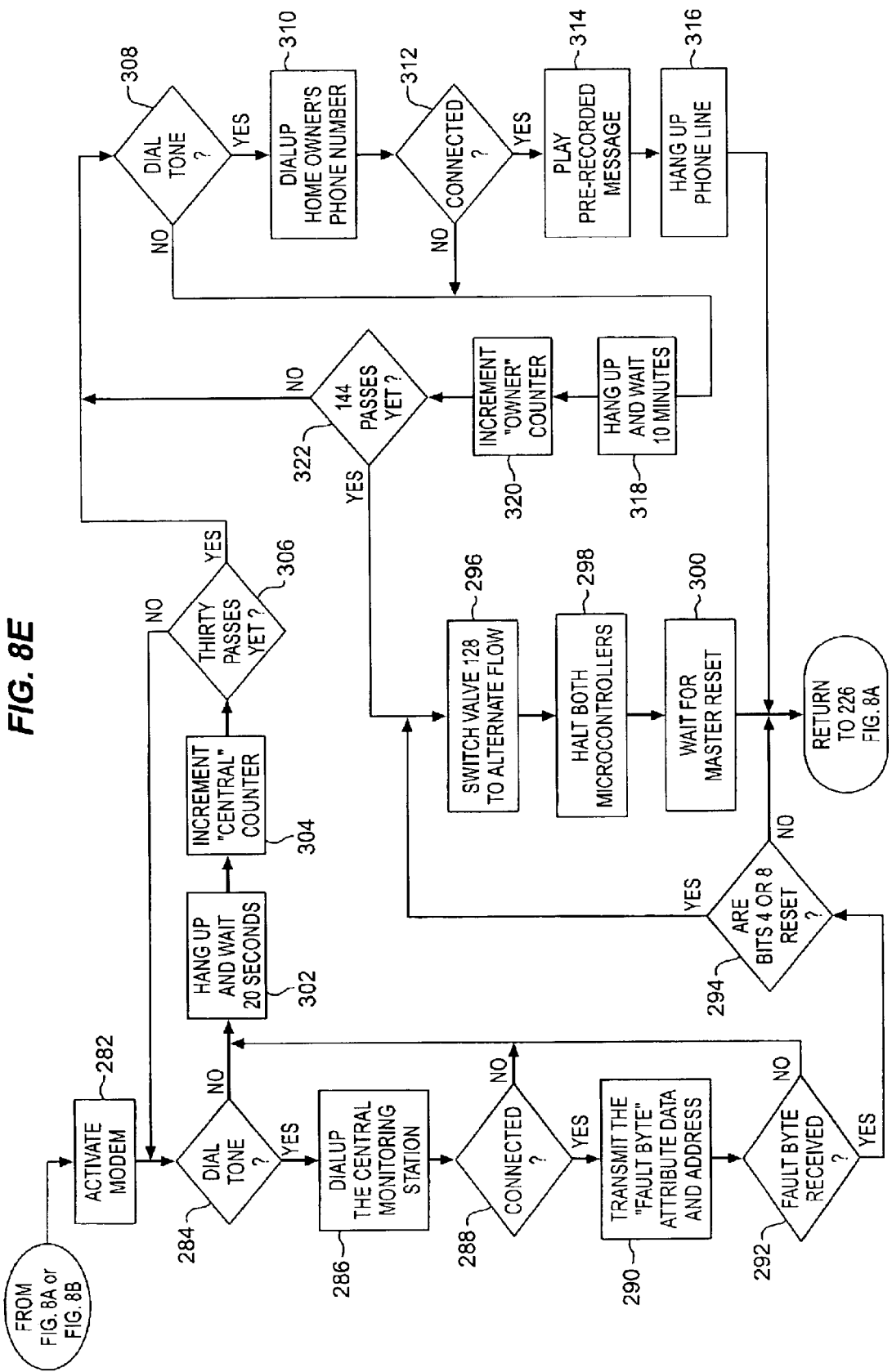

Referring to FIGS. 8A, 8E, there is illustrated therein, a software flow diagram of the steps carried out by the micro-controller 114/116 acting as the "operator". In steps 226 through 246 the disinfection cycle is activated, by turning on the air pump 36, the water pump 52 and the microwave generator 86. Also, electromagnetic valves 38, 58 and 128 are energized to set the flow direction required for disinfecting the effluent. During the disinfection cycle, sensors 41, 66 and 90 are sampled (They measure the air pressure, the water flow rate and the microwaves field strength, respectively). When the water level in the second compartment of the holding tank 28 reaches a predetermined low level, the micro-controller 114/116 will get a "high" signal from sensor 48 or 49 and subsequently will switch valves 38 and 58 to the "alternate" flow position, thereby starting the "flushing" cycle.

Steps 248 through 268 are used to regulate and monitor the "flushing" cycle. During the "flushing cycle" sensors 104 and 62 are sampled by steps 262 through 268 to verify that the air pressure and the water flow rate are within specifications.

Steps 270 through 280 constitute a twenty minutes timing loop to regulate the duration of the "flushing cycle." Note that dual sensors for high and low water are sampled to make sure that each pair is functioning in unison. Also, note that if any parameter is out of specifications, the corresponding bit of the "fault word" is reset for later transmission to the central location which monitors this and the other sewage treatment systems constructed according to the teachings of the present invention.

Referring to FIGS. 8B, 8E, there is illustrated therein, a software flow diagram of the steps carried out by the micro-controller 114/116 acting as the "supervisor". Since both micro-controllers 114/116 run on the same operating software, the "supervisor" knows what the "operator" should do in each step. In steps 227 through 249, each step that the "operator" makes is validated by the "supervisor". If the "operator" fails to activate the appropriate component or fails to detect a parameter out of specifications, the "supervisor" micro-controller will (1) turn off the power to the "operating" micro-controller and (2) jump into the "fault reporting routine" shown in FIG. 8C in order to report the error to the central location via the telephone system.

Referring now to FIGS. 8C, 8D there is illustrated therein, a software flow diagram of the steps carried out by the micro-controller 114/116 to dial-up the telephone number of the central location and report the specific fault. In steps 282 through 288, the telephone number for the central location is dialed and the proper connection is verified. In steps 290 through 292 a "fault byte" is transmitted and "acknowledgment" of reception is verified.

In step 294, bits 4 and 5 are tested to see if they are in the "reset" state. Bits 4 and 5 each represent a catastrophic failure. If bit 4 is reset, it means that valve 58 has switched the effluent into the wrong direction. If bit 5 is reset, it means that the microwave generator 86 is not functioning. If one or both of these faults are detected, the dump valve 128 is switched to the "dump" position (step 296) and both micro-controllers 114/116 are halted (step 298) and the sewage treatment system reverts to a conventional septic tank and drain field operation. Otherwise, the software returns to step 226 in FIG. 8A to continue processing more sewage.

If no dial tone is detected in step 284, the software will jump to step 302. In steps 302 through 306 a timing loop is created to try to call again in 20 seconds, up to thirty tries for a total of 10 minutes. If, after 10 minutes no dial tone is obtained, the sewage treatment system will switch to one call attempt every 10 minutes for up to 144 tries or 24 hours. The computer at the central location (not shown) samples the status of each sewage treatment system at least once every 24 hours. If it can't connect to a particular sewage treatment system within 12 hours, it will dispatch a service technician to repair the non-reporting sewage treatment system.

We claim:

1. In a home sewage treatment system comprising: a septic tank; structure associated with the septic tank for separating infected water effluent from solids and lighter than water materials; structure for aerating the infected water effluent; and structure for dispersing water effluent to a drain field, the improvement residing in structure for using micro-wave energy to substantially disinfect the water effluent before, during or after aerating the water effluent.

2. The home sewage treatment system of claim 1 including a micro-wave chamber coupled between said structure for aerating the infected water effluent and said structure for dispersing water effluent into the drain field and a micro-wave generator in said chamber for treating said infected water effluent with microwave energy to substantially disinfect said water effluent before dispersing such disinfected water effluent into the drain field.

3. The home sewage treatment system of claim 2 wherein said micro-wave chamber includes an undulating winding loop of pipe having an inlet end and an outlet end and a diameter and a wall thickness which enables infected water effluent flowing through said pipe to be disinfected by micro-wave energy from said micro-wave generator passing through said pipe.

4. The home sewage treatment system of claim 3 wherein said pipe has a diameter of two inches or less.

5. The home sewage treatment system of claim 2 wherein said micro-wave generator is operated to heat said infected effluent water to a temperature less than the inactivation temperature of microorganisms which is about 100° C.

6. The home sewage treatment system of claim 2 wherein said microwave generator is operated to produce microwave radiation with a frequency between 1 and 5 GHz.

7. A home sewage treatment system comprising: (a) a septic tank, (b) a holding tank with first and second compartments coupled in series with said septic tank, the first compartment being constructed and arranged to aerate effluent from said septic tank at above ambient temperature and the second compartment being constructed and arranged to clarify effluent from said first compartment, (c) a disinfection chamber including disinfecting means and requiring no chemicals or ultraviolet light bulbs, a pipe with a first water pump coupled between an outlet from said second compartment an inlet to said disinfection chamber, said disinfection chamber having an outlet for discharging disinfected water, and (d) a drain field coupled to the outlet from said second compartment.

8. The home sewage treatment system of claim 7 wherein said holding tank is located underground with the septic tank and a gravity feed connection is provided between an outlet of said septic tank and an inlet to said first compartment of said holding tank.

9. The home sewage treatment system of claim 7 wherein said disinfecting means is micro-wave energy.

10. The home sewage treatment system of claim 9 further comprising: (e) a heat regeneration or heat exchange unit for transferring heat from the disinfected water to the water in said first compartment to aid in killing the bacteria in the infected water and to conserve power.

11. The home sewage treatment system of claim 7 including a micro-controller and redundant dual sensors for detecting a high water level in said second compartment of the holding tank to prevent overflowing of the effluent in case one of the sensors fails to switch on a water pump, the micro-controller being programmed to expect both high-water level sensors to activate almost simultaneously.

12. The home sewage treatment system of claim 11 including means for communicating said system to a municipal location for sending a signal to said municipal location when one of said sensors does not send a signal to said micro-controller when the other sensor sends a signal thereby precluding an overflow condition.

13. The home sewage treatment system of claim 7 including a micro-controller and redundant dual sensors for detecting a low water level in said second compartment of the holding tank to stop a water pump once most of the effluent in the second compartment has been emptied and disinfected, the micro-controller being programmed to expect both low-water level sensors to activate almost simultaneously.

14. The home sewage treatment system of claim 13 including means for communicating said system to a municipal location for sending a signal to said municipal location when one of said sensors does not send a signal to said micro-controller when the other sensor sends a signal thereby precluding a low water condition to prevent the water pump from running dry.

15. The home sewage treatment system of claim 7 including fault detection sensors at different locations in the system, valves in different fluid conduits in the system, pumps coupled to conduits in the system, a micro-controller coupled to said sensors, valves and pumps and means for communicating said micro-controller to a central municipal location whereby, if any component of the system fails to operate or operates below specifications, said micro-controller will automatically report to said central location the exact cause of the fault so that a municipality can dispatch a technician to the home site with a replacement part.

16. The home sewage treatment system of claim 15 comprising a second micro-controller connected in tandem or parallel with said first micro-controller for receiving the same signals in and emitting the same signals out, said first micro-controller functioning as an operator micro-controller and said second micro-controller having circuitry for performing a supervisory function by sensing when the first micro-controller fails to emit a called for signal, disabling the first micro-controller, continuing to operate the home sewage treatment system and report to said central location the failure of said first microcontroller so that the municipality can dispatch a technician to the home site with a replacement micro-controller.

17. The home sewage treatment system of claim 16 wherein said first and second micro-controllers are identical and include at least one of hardware or software for periodically switching the functions of the microcontrollers so that a non-functioning "supervisor" micro-controller will be sensed and will be reported to the central location.

18. The home sewage treatment system of claim 15 wherein said means for communicating includes one of a conventional telephone system or a transponder communicating through a utility's power lines.

19. The home sewage treatment system of claim 15 wherein said micro-controller is constructed, arranged and programmed to up-link to the central location a series of bytes identifying (1) the name and telephone number of the home owner, (2) the home address, (3) the model and serial number of the sewage treatment system, (4) the component that has failed, (5) the severity level (not working at all or working below specifications) and (6) the system's performance attribute data.

20. The home sewage treatment system of claim 15 wherein said micro-controller is constructed, arranged and programmed to periodically up-link a system operating status to said central location, so that, if the sewage treatment system fails to report its operating status within an allocated time, a computer at the central location will dial up the telephone or transponder number of the system and, if the computer gets a busy signal or no answer, it will continue calling for a preset time until it gets through and interrogates the system's operating status, and if this preset time elapses, it will signal the computer operator in the central location of the missing "status" report to prevent a catastrophic failure from going undetected.

21. The home sewage treatment system of claim 15 wherein said micro-controller is constructed, arranged and programmed to generate a status report containing specific values for (1) water flow at each part of the system, (2) radiation level, (3) air pressure, (4) water flow rate, (5) if redundant sensors to detect water levels at the holding tank are working, (6) duration of a scrubbing cycle in the second compartment, and (7) the voltage on a back-up battery.

22. The home sewage treatment system of claim 7 wherein said holding tank is located above ground with the septic tank being located underground and a water pipe and a second water pump associated with the water pipe are arranged between the septic tank and said holding tank for pumping effluent from said septic tank into said holding tank and a pump is provided for pumping clarified water from said second compartment to said disinfection chamber.

23. The home sewage treatment system of claim 22 including flushing structure for periodically flushing out the heavier particles that settle to the bottom of the second or clarifying compartment.

24. The home sewage treatment system of claim 23 wherein said flushing structure includes a series of air jets directed toward the bottom of the second compartment.

25. The home sewage treatment system of claim 24 comprising structure including a valve, a sludge recycling pipe and said first water pump for subsequently pumping back into the septic tank the water and suspended particles that were pumped out of said second compartment for recycling and further digestion of the particles.

26. The home sewage treatment system of claim 7 including a heat exchange unit having a first liquid path coupled to the outlet from said disinfection chamber and a second liquid path coupled to the outlet from said second compartment so that infected water entering said disinfection chamber is preheated by heat in the disinfected water exiting said disinfection chamber.

27. A method for treating sewage in a home sewage treatment system including a septic tank, comprising the steps of: collecting clarified effluent in a compartment; continuously injecting air into the compartment to accelerate the rate of oxidation and decomposition of the microorganisms; supplying the still infected effluent from the compartment to a disinfection chamber; disinfecting the effluent in the disinfection chamber; and, discharging the disinfected effluent into a drain field.

28. The method of claim 27 wherein the step of disinfecting is achieved by irradiating the infected effluent with micro-wave energy.

29. The method of claim 27 including the steps of: providing a holding tank having first and second compartments; supplying effluent from the septic tank to the first compartment; said step of aerating taking place in said first compartment; further clarifying the effluent in the second chamber; and supplying the clarified effluent from the second compartment to the disinfection chamber.

30. The method of claim 29 further including the steps of: providing said holding tank with a capacity between 50 and 600 gallons.

31. The method of claim 29 wherein the size of the first compartment is approximately two thirds the size of the second compartment.

32. The method of claim 29 wherein, as new effluent enters the middle of the first compartment, a weir or dam in the middle area of the holding tank allows effluent in the first compartment to spill over the top of the weir or dam and into the second or clarifying compartment where the effluent clarifies to infected water with heavier particles settling to a bottom of the second compartment.

33. The method of claim 32 including the step of: periodically flushing out the heavier particles that settle to the bottom of the second or clarifying compartment.

34. The method of claim 33 wherein said step of flushing is carried out with a series of air jets directed toward the bottom of the second compartment.

35. The method of claim 33 including the further step of subsequently pumping back into the septic tank the water and suspended particles that were flushed out of said second compartment for recycling and further digestion of the particles.

36. The method of claim 29 including the step of pumping the clarified water from the second compartment into the disinfection chamber when the clarified water reaches a predetermined high level in the second compartment.

37. The method of claim 29 further comprising the step of: transferring heat from the disinfected water to the water in said first compartment to aid in killing bacteria and to conserve power.

38. The method of claim 29 including the step of detecting a high water level in said second compartment of the holding tank with two high water level sensors to prevent overflowing of the effluent in case one of the sensors fails to switch on a water pump, the method requiring both high-water level sensors to activate almost simultaneously.

39. The method of claim 38 including the step of: communicating to a municipal location when one of the sensors does not sense the high water level condition thereby to preclude an overflow condition.

40. The method of claim 29 including the step of: detecting a low water level in said second compartment of the holding tank to stop a water pump once all the effluent in the second compartment has been emptied and disinfected, the method requiring both low-water level sensors to activate almost simultaneously.

41. The method of claim 40 including the step of: communicating to a municipal location when one of the sensors does not sense the low water condition thereby to preclude a low water condition to prevent the water pump from running dry.

42. The method of claim 27 including the steps of: providing fault detection sensors at different locations in the system, valves in different fluid conduits in the system, pumps coupled to conduits in the system; communicating to a central municipal location if any component of the system fails to operate or operates below specifications; and automatically reporting to the central location the exact cause of the fault so that a municipality can dispatch a technician to the home site with a replacement part.

43. The method claim 42 wherein said step of communicating includes one of communicating through a telephone system or communicating through a utility's power lines.

44. The method of claim 42 including the steps of: up-linking to the central location a series of bytes identifying (1) the name and telephone number of the home owner, (2) the home address, (3) the model and serial number of the sewage treatment system, (4) the component that has failed, (5) the severity level (not working at all or working below specifications) and (6) the units performance attribute data.

45. The method of claim 42 including the steps of periodically up-linking the central location, so that, if the sewage treatment system fails to report its operating status within an allocated time, a computer at the central location will dial up the telephone or transponder number of the system and, if the computer gets a busy signal or no answer, it will continue calling for a preset time until it gets through and interrogates the system's operating status, and if this preset time elapses, it will signal the computer operator in the central location of the missing "status" report to prevent a catastrophic failure from going undetected.

46. The method of claim 42 including the step of generating a status report containing specific values for (1) water flow at each part of the system, (2) radiation level, (3) air pressure, (4) water flow rate, (5) if redundant sensors to detect water levels at the holding tank are working, (6) duration of a scrubbing cycle in the second compartment, and (7) the voltage on a back-up battery.

47. The method of claim 42 including the step of providing first and second micro-controllers for controlling the home sewage treatment system, the micro-controllers being connected in tandem or parallel for receiving the same signals in and emitting the same signals out, said second micro-controller having circuitry for performing a supervisory function by sensing when the first micro-controller fails to emit a called for signal, then by disabling the first micro-controller, continuing to operate the home sewage treatment system and by reporting to the central location the failure of the first micro-controller so that the municipality can dispatch a technician to the home site with a replacement micro-controller.

48. The method of claim 47 wherein said first and second microcontrollers are identical and said method includes the step of periodically switching the functions of the micro-controllers so that a non-functioning "supervisor" micro-controller will be sensed and will be reported to the central location.

49. The method of claim 27 including the step of providing a heat exchange unit having a first liquid path coupled to an outlet from said disinfection chamber and a second liquid path coupled to an inlet to said disinfection chamber, and preheating infected water entering said disinfection chamber with the heat in the disinfected water exiting said disinfection chamber.

50. A home sewage treatment system comprising: a septic tank having a first compartment and a second compartment; said first compartment allowing for separation of infected water effluent from solids and lighter than water materials; structure associated with said first compartment for aerating the infected water effluent; said second compartment serving to clarify infected water therein; structure for dispersing water effluent to a drain field, and structure for disinfecting the water effluent from said second compartment without chemicals or ultraviolet light and before dispersing the disinfected water effluent into the drain field.

51. The home sewage treatment system of claim 50 including a heat exchanger coupled between an inlet to said disinfecting structure and an outlet from said disinfecting structure so that that heat in the disinfected water effluent exiting said disinfecting structure can be used to preheat infected water entering said disinfecting structure.

52. The home sewage treatment system of claim 50 wherein said disinfecting structure includes a micro-wave generator in a micro-wave chamber.

53. The home sewage treatment system of claim 51 wherein said disinfecting structure includes an undulating pipe or conduit in said micro-wave chamber for carrying infected water to be disinfected.

54. The home sewage treatment system of claim 50 including flushing structure in said second compartment for periodically flushing out the heavier particles that settle to the bottom of said second or clarifying compartment.

55. The home sewage treatment system of claim 54 wherein said flushing structure includes a series of air jets directed toward the bottom of the second compartment.

56. The home sewage treatment system of claim 55 comprising structure including a valve, a sludge recycling pipe and a water pump for subsequently pumping back into the septic tank the water and suspended particles that were flushed out of said second compartment for recycling and further digestion of the particles.

57. In a home sewage treatment system comprising: a septic tank; structure associated with the septic tank for separating infected water effluent from solids and lighter than water materials; structure for aerating the infected water effluent; and structure for dispersing water effluent to a drain field, the improvement residing in structure for disinfecting the water effluent without chemicals or ultraviolet light and before discharging the water effluent to the drain field.

58. The home sewage treatment system of claim 57 wherein said disinfecting structure comprises structure for heating the water effluent.

59. The home sewage treatment system of claim 58 wherein said disinfecting structure comprises a microwave generator.

60. A home sewage treatment system comprising: a septic tank having a first compartment and a second compartment; said first compartment allowing for separation of infected water effluent from solids and lighter than water materials; structure associated with said first compartment for aerating the infected water effluent; said second compartment serving to clarify infected water therein; structure for dispersing water effluent to a drain field, and structure for disinfecting the water effluent from said second compartment before dispersing the disinfected water effluent into the drain field, a heat exchanger coupled between an inlet to said disinfecting structure and an outlet from said disinfecting structure so that that heat in the disinfected water effluent exiting said disinfecting structure can be used to preheat infected water entering said disinfecting structure.

* * * * *